(12) United States Patent
Chen et al.

(10) Patent No.: US 12,521,179 B2
(45) Date of Patent: Jan. 13, 2026

(54) PATHWAY PLANNING APPARATUS, SURGICAL SYSTEM, AND COMPUTER-READABLE STORAGE MEDIUM

(71) Applicant: SCENERAY CO., LTD, Suzhou (CN)

(72) Inventors: Lei Chen, Suzhou (CN); Weiran Zhu, Suzhou (CN); Yihua Ning, Suzhou (CN)

(73) Assignee: SCENERAY CO., LTD, Suzhou (CN)

( * ) Notice: Subject to any disclaimer, the term of this patent is extended or adjusted under 35 U.S.C. 154(b) by 741 days.

(21) Appl. No.: 17/820,887

(22) Filed: Aug. 19, 2022

(65) Prior Publication Data

US 2023/0414286 A1    Dec. 28, 2023

(30) Foreign Application Priority Data

Jun. 22, 2022    (CN) .......................... 202210715863.1

(51) Int. Cl.
| | |
|---|---|
| *A61B 34/10* | (2016.01) |
| *A61N 1/05* | (2006.01) |
| *A61N 1/36* | (2006.01) |
| *G06T 7/11* | (2017.01) |
| *G06T 7/70* | (2017.01) |

(52) U.S. Cl.
CPC .......... *A61B 34/10* (2016.02); *A61N 1/0534* (2013.01); *A61N 1/36082* (2013.01); *G06T 7/11* (2017.01); *G06T 7/70* (2017.01); *A61B 2034/105* (2016.02); *A61B 2034/107* (2016.02); *G06T 2207/10081* (2013.01); *G06T 2207/10088* (2013.01); *G06T 2207/30016* (2013.01)

(58) Field of Classification Search
CPC .............. A61B 34/10; A61B 2034/105; A61B 2034/107; A61B 2034/108; G06T 7/11; G06T 7/70; G06T 2207/10081; G06T 2207/10088; G06T 2207/30016; G06T 7/0012; G06T 7/12; G06T 7/13; G06T 17/00; A61N 1/0534; A61N 1/36082
See application file for complete search history.

(56) References Cited

U.S. PATENT DOCUMENTS

| | | | |
|---|---|---|---|
| 8,249,690 B2 * | 8/2012 | Doerr .................... | A61B 8/445 600/424 |
| 9,700,715 B2 * | 7/2017 | Dou .................... | A61N 1/36146 |

(Continued)

*Primary Examiner* — Baisakhi Roy
(74) *Attorney, Agent, or Firm* — Andrew C. Cheng

(57) ABSTRACT

A pathway planning apparatus includes a processor configured to plan a pathway for implanting an electrode lead into a brain of a patient, wherein the planned pathway satisfies the following condition: if the electrode lead is implanted into the brain of the patient according to the pathway, the electrode lead is capable of simultaneously making contact with an anterior limb of an internal capsule and a nucleus accumbens in one hemisphere of a brain of the patient. The pathway planned by the pathway planning apparatus enables the electrode lead to simultaneously deliver the electrical stimulation to the anterior limb of the internal capsule and the nucleus accumbens such that a combined electrical stimulation therapy is achieved, which has a better effect of treating diseases such as addictive behaviors, depressive disorders, and obsessive-compulsive disorders.

27 Claims, 9 Drawing Sheets

(56) References Cited

U.S. PATENT DOCUMENTS

| | | | | |
|---|---|---|---|---|
| 2002/0038134 | A1* | 3/2002 | Greenberg | A61N 1/36046 607/1 |
| 2007/0255338 | A1* | 11/2007 | Wahlstrand | A61B 5/293 607/45 |
| 2008/0103547 | A1* | 5/2008 | Okun | A61N 1/36082 607/45 |
| 2009/0198306 | A1* | 8/2009 | Goetz | A61N 1/36185 600/407 |
| 2009/0240147 | A1* | 9/2009 | Doerr | A61N 1/0534 607/116 |
| 2012/0271151 | A1* | 10/2012 | LaVoilette | A61B 6/5247 600/411 |
| 2014/0235920 | A1* | 8/2014 | Schneider | A61N 5/1049 600/1 |

* cited by examiner

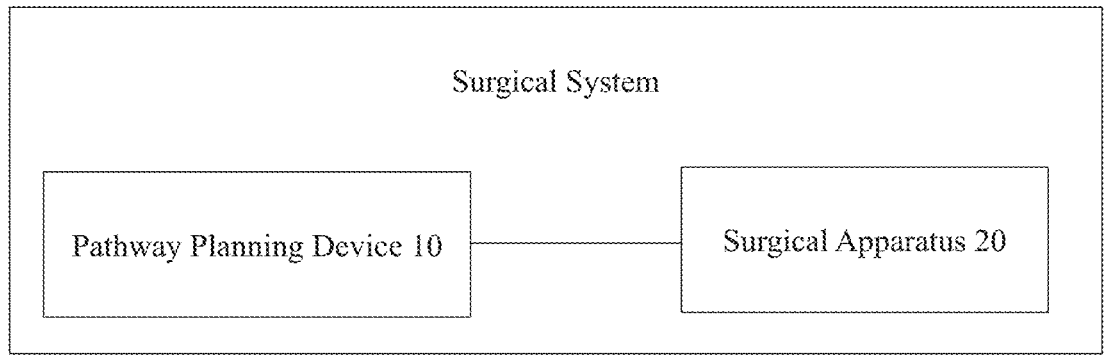

FIG. 1

Planning a pathway for implanting an electrode lead into a patient's brain, wherein the planned pathway satisfies the following condition: if the electrode lead is implanted into the brain of the patient according to the pathway, the electrode lead implanted into the brain of the patient is capable of simultaneously making contact with the anterior limb of internal capsule and the nucleus accumbens in a hemisphere of the brain of the patient ⎯ S101

FIG. 2

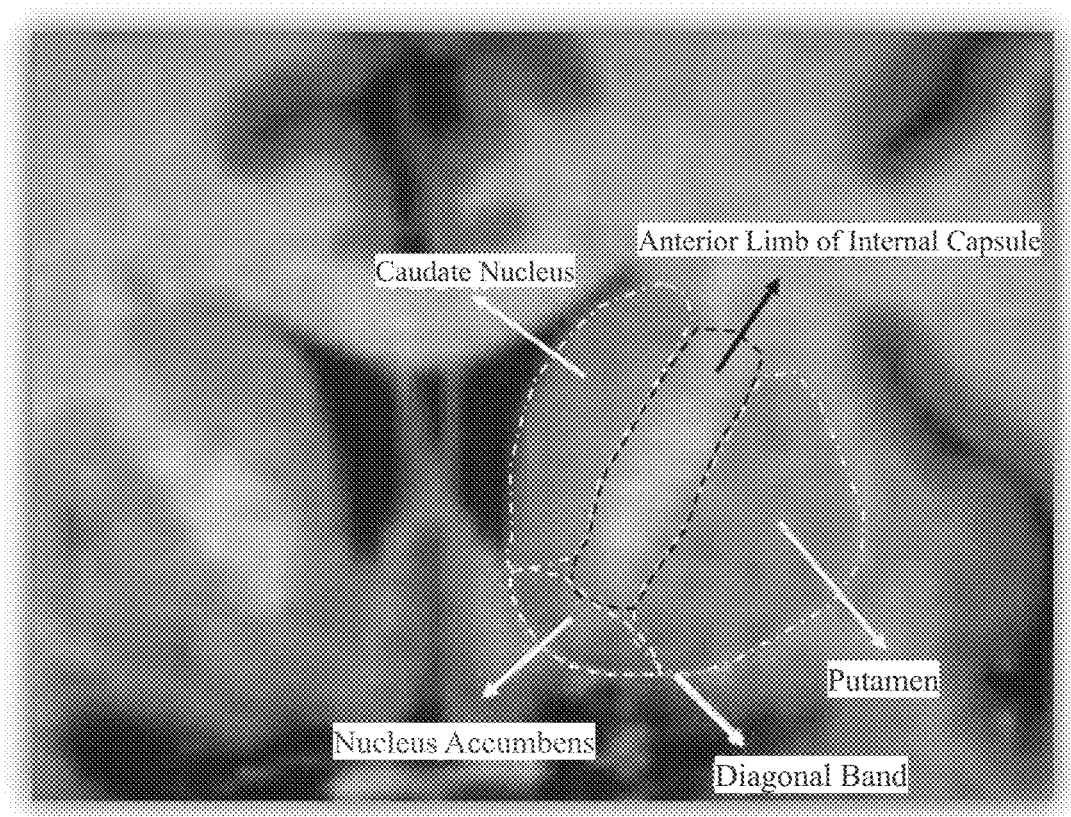

FIG. 4

| Locating a reference point on the basis of the image data and generate a two-dimensional image of the brain corresponding to the reference point, wherein the two-dimensional image of the brain comprises one or more of a two-dimensional image of a coronal section, a two-dimensional image of a median sagittal section, and a two-dimensional image of a transverse section | S301 |

↓

| Locating the extreme point of the ventral contour of the nucleus accumbens by utilizing the two-dimensional image of the brain corresponding to the reference point | S302 |

FIG. 5

Acquiring contour data of the anterior limb of internal capsule on the basis of the image data — S601

Planning the pathway by using spatial constraints on the pathway formed by the contour data of the anterior limb of internal capsule and based on the positioning data of the extreme points, such that the electrode lead sequentially passes through the anterior limb of internal capsule and the nucleus accumbens during the implantation process — S602

FIG. 8

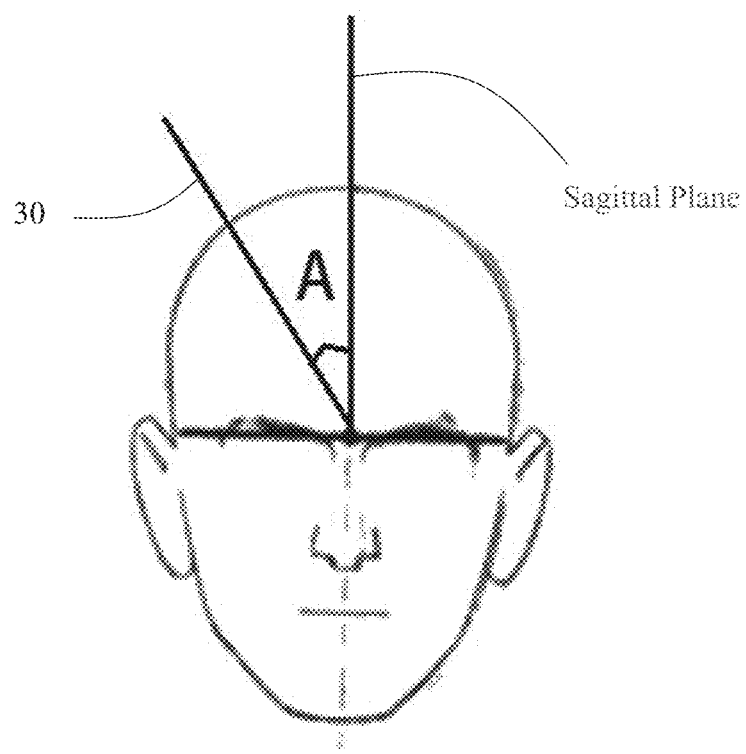

FIG. 9

Planning a pathway for implanting an electrode lead into a brain of a patient, wherein the planned pathway satisfies the following condition: if the electrode lead is implanted into the brain of the patient according to the pathway, the electrode lead is capable of simultaneously making contact with an anterior limb of an internal capsule and a nucleus accumbens in one hemisphere of the brain of the patient ⟶ 701

Executing a surgical operation of implanting the electrode lead into the brain of the patient according to the pathway, such that the electrode lead makes contact with the anterior limb of the internal capsule and the nucleus accumbens in one hemisphere of the brain of the patient ⟶ 702

FIG. 14

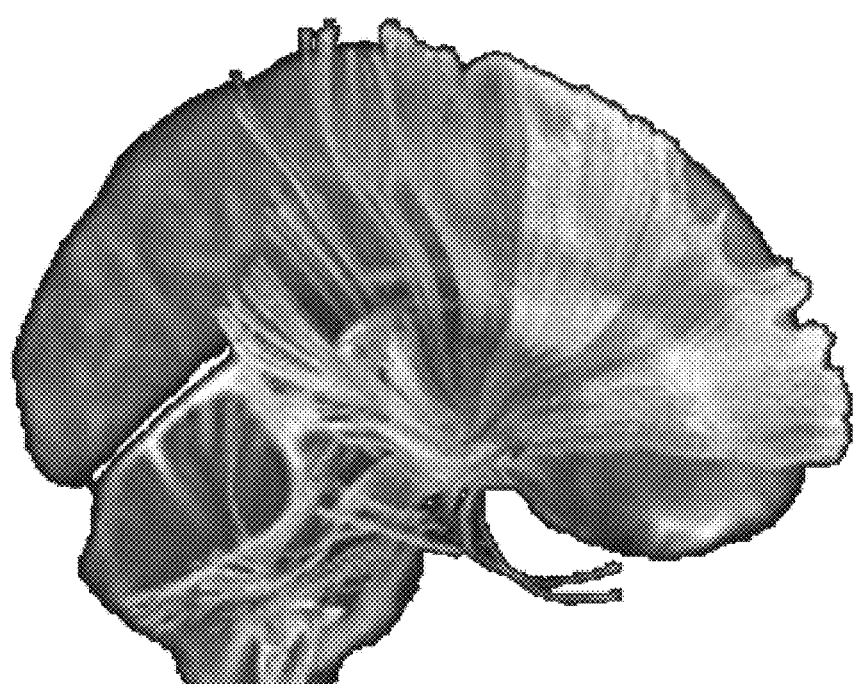

PATHWAY PLANNING APPARATUS, SURGICAL SYSTEM, AND COMPUTER-READABLE STORAGE MEDIUM

FIELD

The present application relates to the technical field of implantable instruments, and in particular, relates to a pathway planning apparatus, a surgical system, and a computer-readable storage medium.

BACKGROUND

With the development of science and technology and the social progress, patients are longing for improving their quality of life by a variety of treatment means, among which implantable instruments exhibit a very broad application prospect. The implantable instrument refers to a medical instrument which entirely or partially enters a human body or a cavity (an orifice) by means of a surgical operation, or is used to replace the superficial epithelium or ocular surface of the human body; and after surgical procedures are completed, it remains in the human body for more than 30 days (inclusive) or is absorbed by the human body. A stimulator is a type of implantable instrument, and generally includes an IPG, an extension lead, and an electrode lead. It can provide patients with a refined electrical stimulation therapy with controllable parameters, and thus is popular among many consumers in the market.

In recent years, it has been attempting to apply a deep brain stimulation (DBS) technology to the anti-relapse treatment of drug addiction. However, a specific intracephalic target to be intervened by the DBS, the adaptability of a DBS apparatus with a target, a stimulation output mode of DBS and others are still unclear or are blank fields.

A Chinese Patent Application Publication No. 111588463A discloses a method and apparatus for determining a surgical plan, and a storage medium. The method includes: acquiring an object tissue image of an object of interest; acquiring a white matter fiber tract image of the object of interest; performing image fusion on the object tissue image and the white matter fiber tract image to obtain a fused object image; displaying the fused object image, wherein the fused object image includes content of the object tissue image and content of the white matter fiber tract image, such that a surgical pathway can be planned in combination with the content of the object tissue image and the content of the white matter fiber tract image. This method does not disclose the specific pathway derived by planning.

On this basis, the present application provides a pathway planning apparatus, a surgical system, and a computer-readable storage medium to solve the above problems existing in the prior art.

SUMMARY

An object of the present application is to provide a pathway planning apparatus, a surgical system and method, and a computer-readable storage medium for planning an implantation pathway of an electrode lead, such that the electrode lead performs combined electric stimulation on a nucleus accumbens and an anterior limb of an internal capsule.

The object of the present application is achieved by the following technical solution.

In a first aspect, the present application provides a pathway planning apparatus, comprising a processor which is configured:

to plan a pathway to obtain a planned pathway for implanting an electrode lead into a predetermined area of a brain of a patient such that after the electrode lead has been implanted into the brain of the patient according to the planned pathway, the electrode lead is capable of making contact with both an anterior limb of an internal capsule and a nucleus accumbens in one hemisphere of a brain of the patient to deliver an electrical stimulation to the anterior limb of the internal capsule and the nucleus accumbens.

The beneficial effects of this technical solution lie in that a specific implantation pathway is planned for the electrode lead, and the electrode lead is implanted into one hemisphere (for example, a left hemisphere or a right hemisphere) of the brain of the patient according to this pathway, such that the combined electrical stimulation can be performed on the nucleus accumbens and the anterior limb of the internal capsule in this hemisphere for treating the patient. The pathway planned by the pathway planning apparatus enables the electrode lead to simultaneously make contact with both the anterior limb of the internal capsule and the nucleus accumbens in one hemisphere. In this way, the electrode lead is capable of simultaneously delivering the electrical stimulation to the anterior limb of the internal capsule and the nucleus accumbens, such that a combined electrical stimulation therapy is achieved. In the field of DBS, a physician used to perform an electrical stimulation therapy on a specific brain tissue. As a result, after an electrode lead is implanted into the brain of the patient, it is impossible to simultaneously deliver electrical stimulations to a plurality of brain tissues, let alone a combined electrical stimulation therapy for two specific brain tissues (i.e., the anterior limb of the internal capsule and the nucleus accumbens), even though the electrode lead may be provided with a plurality of electrode slices which however are configured to deliver electrical stimulations to the same brain tissue (a nucleus mass). The pathway planning apparatus according to the present application can plan an implantation pathway of the electrode lead, such that, after the electrode lead is implanted into the brain of the patient, the combined electrical stimulation therapy can be performed on the anterior limb of the internal capsule and the nucleus accumbens in one hemisphere of the brain, showing a better effect of treating diseases such as addiction behaviors, depressive disorders, and obsessive-compulsive disorders.

In some possible embodiments of the present disclosure, the planned pathway leads to the anterior limb of the internal capsule and the nucleus accumbens in one hemisphere of the brain of the patient in directions of from superior to inferior, from anterior to posterior and from lateral to medial such that after the electrode lead has been implanted into the predetermined area of the brain of the patient according to the planned pathway, the electrode lead passes through the anterior limb of the internal capsule and the nucleus accumbens from superior to inferior, from anterior to posterior and from lateral to medial; and the patient suffers from a disease comprising one or more of the following mental disorders: depressive disorder, manic-depressive psychosis, anxiety disorder, post-traumatic stress psychological disorder, obsessive-compulsive disorder, behavior disorder, emotional disorder, memory disorder, psychological state disorder, drug addiction, and autism.

The beneficial effects of this technical solution lie in that the electrode lead is allowed to pass through the anterior limb of the internal capsule and the nucleus accumbens along a specific direction, and the combined electric stimulation therapy for the anterior limb of the internal capsule and the nucleus accumbens is used for treating diseases of a specific type, for example for treating a variety of mental disorders, such that the condition of the patient can be effectively alleviated, and the disease of the patient can even be cured.

In some possible embodiments of the present disclosure, the processor is further configured to plan the pathway by:

acquiring image data of the brain of the patient, the image data comprising magnetic resonance image data and/or CT image data;

locating an extremum point of a ventral contour of the nucleus accumbens on the basis of the image data to obtain location data of the extremum point; and planning, on the basis of the location data of the extremum point, a pathway for implanting the electrode lead into the brain of the patient, such that a straight line where the pathway is located passes the extremum point from superior to inferior, from anterior to posterior and from lateral to medial.

The beneficial effects of this technical solution lie in that the extremum point of the ventral contour of the nucleus accumbens is positioned by using the image data, and the implantation pathway of the electrode lead is planned by using the extremum point, such that the straight line where the planned pathway is located passes the extremum point.

In some possible embodiments of the present disclosure, the processor is further configured to determine the straight line by:

locating a set point of the anterior limb of the internal capsule on the basis of the image data to obtain location data of the set point; and determining the straight line on the basis of the location data of the set point and the location data of the extremum point, such that the straight line passes the set point and the extremum point.

The beneficial effects of this technical solution lie in that a constrain on the pathway is created by using the set point of the anterior limb of the internal capsule and the extremum point of the nucleus accumbens, and the implantation pathway of the electrode lead is obtained by planning in a two-point defining one-line manner, such that the electrode lead passes through the anterior limb of the internal capsule and the nucleus accumbens in a sequential order during the process of implanting from superior to inferior, from anterior to posterior and from lateral to medial.

In some possible embodiments of the present disclosure, the processor is further configured to locate the set point of the anterior limb of the internal capsule by:

acquiring a segmentation result of the anterior limb of the internal capsule on the basis of the image data, wherein the segmentation result of the anterior limb of the internal capsule is used to indicate a plurality of regions of the anterior limb of the internal capsule;

determining one of the regions as a region of interest on the basis of a mapping relation between each region and a prefrontal lobe, such that a white matter fiber tract running over the region of interest can be mapped to a prefrontal cortex of interest, wherein the prefrontal cortex of interest refers to a prefrontal cortex associated with the disease of the patient; and locating, from the region of interest, the set point of the anterior limb of the internal capsule.

The beneficial effects of this technical solution lie in that the segmentation result of the anterior limb of the internal capsule is acquired by using the image data, and the set point of the anterior limb of the internal capsule is then located by using the segmentation result of the anterior limb of the internal capsule, such that, when the implantation pathway passes the set point, the electrode lead can release the energy of electrical stimulation to a portion (i.e., the region of interest) in contact with the electrode lead, of the anterior limb of the internal capsule. This energy is projected to the prefrontal cortex of interest via the white matter fiber tract of the region of interest, and precisely acts on the specific prefrontal cortex associated with the disease of the patient, thereby realizing precise treatment of mental disorders.

In some possible embodiments of the present disclosure, the processor is further configured to determine the straight line by:

making the straight line be within a reference plane with an acute angle, formed between the straight line and any one transverse plane of the brain being equal to a second preset angle, wherein the reference plane satisfies the following condition: the extremum point is within the reference plane, and an acute angle formed by the reference plane and any one sagittal plane of the brain is equal to a first preset angle, and a normal line of the reference plane is parallel to any one coronal plane of the brain.

The beneficial effects of this technical solution lie in that the straight line at which this pathway is located is disposed within a specific reference plane, and forms a specific acute angle (i.e., the second preset angle) with any one transverse plane of the brain. To set the reference plane, a plurality of conditions need to be satisfied as follows: the extremum point must be within the reference plane; the reference plane and any one sagittal plane form a specific acute angle (i.e., the first preset angle); and the normal of the reference plane is parallel to the coronal plane, that is, a projection of the reference plane on the coronal plane is a straight line. In this way, the straight line where the planned pathway is located may pass through the anterior limb of the internal capsule and the nucleus accumbens along a specific direction and at a specific angle. Therefore, the electrode lead implanted according to such a pathway can pass through the anterior limb of the internal capsule and the nucleus accumbens along a specific direction and at a specific angle, thereby achieving the combined electric stimulation therapy for these two brain tissues.

In some possible embodiments of the present disclosure, the first preset angle is not less than 5 degrees and not greater than 85 degrees, and the second preset angle is not less than 15 degrees and less than 90 degrees.

The beneficial effects of this technical solution lie in that, since the brain structure varies from person to person and each person differs in brain structure, the value of each of the first preset angle and the second preset angle may be within a wide value range, as long as the combined electrical stimulation can be performed on the anterior limb of the internal capsule and the nucleus accumbens in one hemisphere of the brain of the patient.

In some possible embodiments of the present disclosure, the first preset angle is not less than 15 degrees and not greater than 45 degrees, and the second preset angle is not less than 40 degrees and not greater than 85 degrees.

The beneficial effects of this technical solution lie in that, although each person differs in brain structure, most people have a relatively similar brain structure; in terms of probability, a preset angle range can be preferably used to quickly determine the direction of the implantation pathway, which is sufficient to deal with the normal condition of most people; and for a small subset of people whose brain structures significantly differ from those of ordinary people, a wider range can be used as an alternative for helping a physician to plan a pathway for implanting the electrode lead.

In some possible embodiments of the present disclosure, the processor is further configured to determine the first preset angle and the second preset angle by:

locating a set point of the anterior limb of the internal capsule on the basis of the image data to obtain location data of the set point; and determining the first preset angle and the second preset angle on the basis of the location data of the set point and the location data of the extremum point.

The beneficial effects of this technical solution lie in that, before the implantation pathway is determined by using the first preset angle, the second preset angle and the extremum point, taking the set point of the anterior limb of the internal capsule and the extremum point of the nucleus accumbens as constraints greatly reduces the value ranges of the first and second preset angles, as well as the range of the implantation pathway of the electrode lead during an implantation process, in particular when the values of the first and second preset angles can be within a wider value range, such that the data volume of all the feasible solutions of the first and second preset angles can be greatly decreased.

In some possible embodiments of the present disclosure, the processor is further configured to locate the extremum point of the ventral contour of the nucleus accumbens by:

positioning a reference point on the basis of the image data, and generating a two-dimensional image of the brain corresponding to the reference point, wherein the two-dimensional image of the brain corresponding to the reference point comprises one or more of a two-dimensional image of a coronal plane, a two-dimensional image of a sagittal plane, and a two-dimensional image of a transverse plane; and locating the extremum point of the ventral contour of the nucleus accumbens by using the two-dimensional image of the brain corresponding to the reference point.

The beneficial effects of the technical solution lie in that a reference point is positioned by using image data, wherein the reference point may be, for example, an anterior commissure, a posterior commissure, or a midpoint between the two; after the reference point is positioned, the coronal plane, sagittal plane, and transverse plane of the brain corresponding to the reference point, i.e., the coronal plane (in other words, the reference point is within the coronal plane), sagittal plane, and transverse plane passing through the reference point, can be positioned, and one or more of two-dimensional images corresponding to the coronal plane, sagittal plane, and transverse plane are generated by using three-dimensional image data; and since the ventral contour of the nucleus accumbens has a parabola-like shape presented in the above two-dimensional image, the extremum point of the ventral contour of the nucleus accumbens can be positioned therefrom, and the step of locating the extremum point can be implemented by intelligent identification or manual calibration. For a physician, such a method for locating the extremum point is very visual and can be quickly calibrated by experience. Furthermore, by means of intelligent identification, an edge detection algorithm and/or an image segmentation algorithm may also be used to quickly identify the contour of the nucleus accumbens, such that the extremum point of the ventral contour of the nucleus accumbens is positioned. In the pathway planning apparatus according to the present application, the two-dimensional image is generated by using the reference point, and the extremum point is positioned by using the two-dimensional image. Such a method of locating the extremum point is simple in computing process, low in computing load, and high in computing speed, and also has fewer computing resources consumed.

In some possible embodiments of the present disclosure, the reference point is a midpoint of a connecting line between an anterior commissure and a posterior commissure of the brain; or the reference point is the anterior commissure of the brain; or the reference point is the posterior commissure of the brain.

The beneficial effects of this technical solution lie in that, by taking the anterior commissure, the posterior commissure, or the midpoint of the connecting line between the anterior commissure and the posterior commissure as a reference point, the advantages of simple operation and easy implementation are achieved, regardless of whether the intelligent identification mode or the manual calibration mode is used. For a physician, such a method of positioning the reference point is very visual, and can be quickly calibrated by experience. Furthermore, by means of intelligent identification, the edge detection algorithm may also be used to quickly obtain the contour of the entire brain, the anterior commissure and the posterior commissure can be positioned therefrom, such that the reference point is positioned.

In some possible embodiments of the present disclosure, the processor is further configured to locate the extremum point of the ventral contour of the nucleus accumbens by:

receiving an adjustment operation for each of the two-dimensional images, and in response to the adjustment operation, adjusting one or more of the following parameters of the two-dimensional image: brightness, contrast, saturation, exposure, hue, grayscale, and scaling ratio; and locating the extremum point of the ventral contour of the nucleus accumbens by using the adjusted two-dimensional image.

The beneficial effects of the technical solution lie in that a physician can manually adjust the parameters of the two-dimensional images, and adjusting the parameters can lead to a change in the display effect of the two-dimensional image, which facilitates the determination of the extremum point therefrom. The parameters adjusted are not limited in the present application, and may be, for example, one or more of a plurality of parameters that affect a display effect. Obviously, the adjustment of one or more of these parameters enables the ventral contour of the nucleus accumbens to be more prominent and clearer (or in other words, with higher contrast), which makes the positioned extremum point more precise and reliable with higher positioning speed and high positioning efficiency, such that the efficiency of pathway planning is improved as a whole.

In some possible embodiments of the present disclosure, the adjustment operation is an operation of adjusting a parameter curve, and is configured to adjust the brightness, contrast, or grayscale of the two-dimensional image; or the adjustment operation is an operation of adjusting a parameter progress bar, and is configured to adjust the brightness, contrast, saturation, exposure, hue, grayscale, and scaling ratio of the two-dimensional image; or the adjustment operation is an operation of adjusting a parameter value, and is configured to adjust the brightness, contrast, saturation, exposure, hue, grayscale, and scaling ratio of the two-dimensional image.

The beneficial effects of this technical solution lie in that the physician is allowed to adjust the brightness or contrast by adjusting the parameter curve, or to adjust a variety of parameters by adjusting the parameter progress bars, or to adjust a variety of parameters by adjusting the parameter values, such that the physician can choose a parameter adjustment mode on the basis of personal preference in order to quickly adjust the display effect of the two-dimensional image, thereby further improving the efficiency of pathway planning.

In some possible embodiments of the present disclosure, the processor is further configured to locate the extremum point of the ventral contour of the nucleus accumbens by:

generating a three-dimensional model of the brain of the patient on the basis of the image data; and locating the extremum point of the ventral contour of the nucleus accumbens by using the three-dimensional model.

The beneficial effects of this technical solution lie in that the three-dimensional model of the brain is generated by using the image data, the extremum point is then positioned by means of the three-dimensional model, and the extremum point can be positioned in a manner of intelligent identification or manual calibration. When manual calibration is used, the three-dimensional model has visuality stronger than that of the image data and the two-dimensional image, and the physician may calibrate the extremum point more conveniently and quickly. When intelligent identification is used, compared with the image data and the two-dimensional image (the image data and the two-dimensional image needing to be completed by means of an interpolation algorithm so as to obtain the extremum point), the three-dimensional model has a continuous shape (or contour), and can perform computation quickly to obtain the extremum point without completing the data, and it is low in computing load, high in computing speed, and high in computing efficiency, and also has fewer computing resources consumed.

In some possible embodiments of the present disclosure, the processor is further configured to plan the pathway by:

generating a three-dimensional model of the brain of the patient on the basis of the image data;

displaying the three-dimensional model by using a display device, wherein the three-dimensional model comprises a three-dimensional structure of the nucleus accumbens and a three-dimensional structure of the anterior limb of the internal capsule; and receiving a pathway planning operation by using an interactive device, and in response to the pathway planning operation, planning the pathway.

The beneficial effects of this technical solutions lie in that the nucleus accumbens and the anterior limb of the internal capsule can be simultaneously displayed in the three-dimensional model, such that the physician designs a surgical pathway according to the displayed three-dimensional structures of two targets (namely, the nucleus accumbens and the anterior limb of the internal capsule).

In a second aspect, the present application provides a pathway planning method, which comprises:

planning a pathway for implanting an electrode lead into a brain of a patient, wherein the planned pathway satisfies the following condition: if the electrode lead is implanted into the brain of the patient according to the pathway, the electrode lead is capable of simultaneously making contact with an anterior limb of an internal capsule and a nucleus accumbens in one hemisphere of a brain of the patient, and wherein the electrode lead is configured to deliver an electrical stimulation to the anterior limb of the internal capsule and the nucleus accumbens.

In some possible embodiments of the present disclosure, the planned pathway leads to the anterior limb of the internal capsule and the nucleus accumbens in one hemisphere of the brain of the patient in directions of from superior to inferior, from anterior to posterior and from lateral to medial such that after the electrode lead has been implanted into the predetermined area of the brain of the patient according to the planned pathway, the electrode lead passes through the anterior limb of the internal capsule and the nucleus accumbens from superior to inferior, from anterior to posterior and from lateral to medial; and the patient suffers from a disease comprising one or more of the following mental disorders: depressive disorder, manic-depressive psychosis, anxiety disorder, post-traumatic stress psychological disorder, obsessive-compulsive disorder, behavior disorder, emotional disorder, memory disorder, psychological state disorder, drug addiction, and autism.

In some possible embodiments of the present disclosure, planning the pathway for implanting the electrode lead into the brain of the patient comprises:

acquiring image data of the brain of the patient, the image data comprising magnetic resonance image data and/or CT image data;

locating an extremum point of a ventral contour of the nucleus accumbens on the basis of the image data to obtain location data of the extremum point; and planning, on the basis of the location data of the extremum point, a pathway for implanting the electrode lead into the brain of the patient, such that a straight line where the pathway is located passes the extremum point from superior to inferior, from anterior to posterior and from lateral to medial.

In some possible embodiments of the present disclosure, a process of determining the straight line comprises:

locating a set point of the anterior limb of the internal capsule on the basis of the image data to obtain location data of the set point; and determining the straight line on the basis of the location data of the set point and the location data of the extremum point, such that the straight line passes the set point and the extremum point.

In some possible embodiments of the present disclosure, positioning the set point of the anterior limb of the internal capsule on the basis of the image data comprises:

acquiring a segmentation result of the anterior limb of the internal capsule on the basis of the image data, wherein the segmentation result of the anterior limb of the internal capsule is used to indicate a plurality of regions of the anterior limb of the internal capsule;

determining one of the regions as a region of interest on the basis of a mapping relation between each region and a prefrontal lobe, such that a white matter fiber tract running over the region of interest can be mapped to a prefrontal cortex of interest, wherein the prefrontal cortex of interest refers to a prefrontal cortex associated with the disease of the patient; and positioning, from the region of interest, the set point of the anterior limb of the internal capsule.

In some possible embodiments of the present disclosure, a process of determining the straight line comprises:

making the straight line be within a reference plane with an acute angle, formed between the straight line and any one transverse plane of the brain, being equal to a second preset angle, wherein the reference plane satisfies the following condition: the extremum point is within the reference plane, and an acute angle formed by the reference plane and any one sagittal plane of the brain is equal to a first preset angle, and a normal of the reference plane is parallel to any one coronal plane of the brain.

In some possible embodiments of the present disclosure, the first preset angle is not less than 5 degrees and not greater than 85 degrees, and the second preset angle is not less than 15 degrees and less than 90 degrees.

In some possible embodiments of the present disclosure, the first preset angle is not less than 15 degrees and not greater than 45 degrees, and the second preset angle is not less than 40 degrees and not greater than 85 degrees.

In some possible embodiments of the present disclosure, a process of determining the first preset angle and the second preset angle comprises:

locating a set point of the anterior limb of the internal capsule on the basis of the image data to obtain location data of the set point; and determining the first preset angle and the second preset angle on the basis of the location data of the set point and the location data of the extremum point.

In some possible embodiments of the present disclosure, locating the extremum point of the ventral contour of the nucleus accumbens on the basis of the image data comprises:

locating a reference point on the basis of the image data, and generating a two-dimensional image of the brain corresponding to the reference point, wherein the two-dimensional image of the brain corresponding to the reference point comprises one or more of a two-dimensional image of a coronal plane, a two-dimensional image of a sagittal plane, and a two-dimensional image of a transverse plane; and locating the extremum point of the ventral contour of the nucleus accumbens by using the two-dimensional image of the brain corresponding to the reference point.

In some possible embodiments of the present disclosure, the reference point is a midpoint of a connecting line between an anterior commissure and a posterior commissure of the brain; or the reference point is the anterior commissure of the brain; or the reference point is the posterior commissure of the brain.

In some possible embodiments of the present disclosure, locating the extremum point of the ventral contour of the nucleus accumbens by using the two-dimensional image of the brain corresponding to the reference point comprises:

receiving an adjustment operation for each of the two-dimensional images, and in response to the adjustment operation, adjusting one or more of the following parameters of the two-dimensional image: brightness, contrast, saturation, exposure, hue, grayscale, and scaling ratio; and locating the extremum point of the ventral contour of the nucleus accumbens by using the adjusted two-dimensional image.

In some possible embodiments of the present disclosure, the adjustment operation is an operation of adjusting a parameter curve, and is configured to adjust the brightness, contrast, or grayscale of the two-dimensional image; or the adjustment operation is an operation of adjusting a parameter progress bar, and is configured to adjust the brightness, contrast, saturation, exposure, hue, grayscale, and scaling ratio of the two-dimensional image; or the adjustment operation is an operation of adjusting a parameter value, and is configured to adjust the brightness, contrast, saturation, exposure, hue, grayscale, and scaling ratio of the two-dimensional image.

In some possible embodiments of the present disclosure, locating the extremum point of the ventral contour of the nucleus accumbens on the basis of the image data comprises:

generating a three-dimensional model of the brain of the patient on the basis of the image data; and locating the extremum point of the ventral contour of the nucleus accumbens by using the three-dimensional model.

In some possible embodiments of the present disclosure, planning the pathway for implanting the electrode lead into the brain of the patient comprises:

generating a three-dimensional model of the brain of the patient on the basis of the image data;

displaying the three-dimensional model by using a display device, wherein the three-dimensional model comprises a three-dimensional structure of the nucleus accumbens and a three-dimensional structure of the anterior limb of the internal capsule; and receiving a pathway planning operation by using an interactive device, and in response to the pathway planning operation, planning the pathway.

In a third aspect, the present application provides a surgical system, which comprises:

any pathway planning apparatus described above for planning a pathway for implanting an electrode lead into a brain of a patient; and a surgical apparatus for executing a surgical operation of implanting the electrode lead into the brain of the patient according to the pathway, such that the electrode lead makes contacts with an anterior limb of an internal capsule and a nucleus accumbens in one hemisphere of the brain of the patient, wherein the electrode lead is configured to deliver an electrical stimulation to the anterior limb of the internal capsule and the nucleus accumbens.

The beneficial effects of the technical solution lie in that the electrode lead is implanted into the brain of the patient according to the planned pathway by executing an implantation surgery via a surgical apparatus.

In some possible embodiments of the present disclosure, the planned pathway leads to the anterior limb of the internal capsule and the nucleus accumbens in one hemisphere of the brain of the patient in directions of from superior to inferior, from anterior to posterior and from lateral to medial such that after the electrode lead has been implanted into the predetermined area of the brain of the patient according to the planned pathway, the electrode lead passes through the anterior limb of the internal capsule and the nucleus accumbens from superior to inferior, from anterior to posterior and from lateral to medial; and the patient suffers from a disease comprising one or more of the following mental disorders: depressive disorder, manic-depressive psychosis, anxiety disorder, post-traumatic stress psychological disorder, obsessive-compulsive disorder, behavior disorder, emotional disorder, memory disorder, psychological state disorder, drug addiction, and autism.

In a fourth aspect, the present application provides a computer-readable storage medium storing a computer program, which, when executed by the processor, achieves the function of any pathway planning apparatus described above, or implements the steps of any pathway planning method described above.

BRIEF DESCRIPTION OF THE DRAWINGS

The present application is further explained below in conjunction with the accompanying drawings and the embodiments.

FIG. 1 shows a structural block diagram of a surgical system according to an embodiment of the present application;

FIG. 2 shows a schematic flow chart of a pathway planning method according to the present application;

FIG. 4 shows a portion of a two-dimensional image of a coronal plane of a brain according to the present application;

FIG. 5 shows a schematic flow chart of locating an extremum point according to an embodiment of the present application;

FIG. 8 shows another schematic flow chart of planning a pathway according to the present application;

FIG. 9 shows a schematic structural diagram of a brain from a view angle of coronal plane according to the present application;

FIG. 14 shows a schematic flow chart of a surgical method according to an embodiment of the present application; and FIG. 15 shows a schematic structural diagram of an anterior limb of an internal capsule of a brain.

DESCRIPTION OF THE EMBODIMENTS

Figure 3:
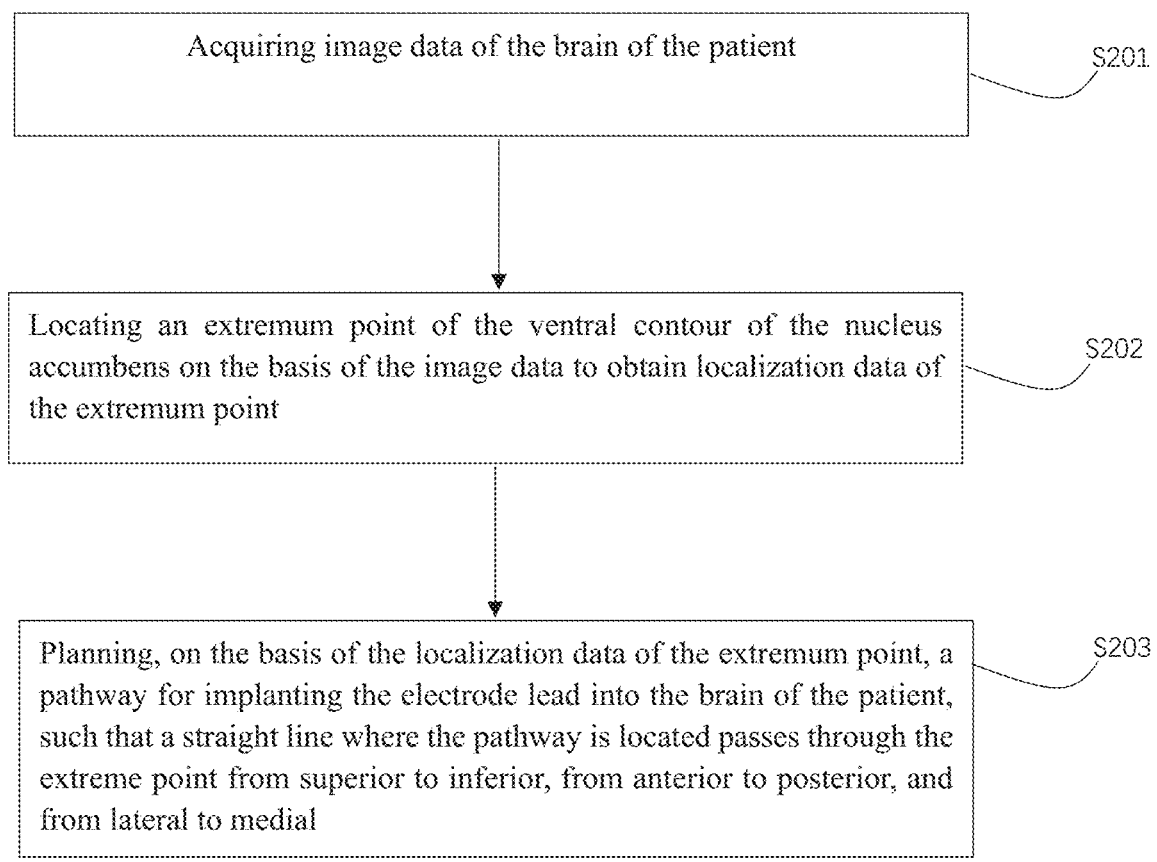
FIG. 3 shows a schematic flow chart of planning a pathway according to an embodiment of the present application.

The following will describe the technical solutions of the present application in combination with the accompanying drawings and particular embodiments in the present application. It should be noted that the embodiments or technical features described below can be randomly combined with each other to form a new embodiment.

In the present application, "at least one" refers to one or more, and "more" refers to two or more. The term "and/or" describes an association relation between associated objects, indicating the presence of three possible types of relations. For example, A and/or B may indicate: A existing alone, both A and B existing, or B existing alone, wherein A and B may be single or plural. The character "/" generally indicates an "or" relation between front and back associated objects. "At least one of" or a similar expression refers to any combination of the items followed, including any combination of single items or plural items. For example, at least one of a, b or c may represent: a, b, c, a and b, a and c, b and c, a and b and c, wherein a, b and c may be single or multiple. It is worth noting that "at least one" may also be interpreted as "one or more".

It should also be noted that, in the present application, the term such as "exemplary" or "for example" is used to indicate serving as an example, illustration or explanation. Any embodiment or design scheme described following "illustratively" or "for example" in the present application should not be construed as being preferred or advantageous over other embodiments or design schemes. Rather, the use of the term such as "exemplary" or "for example" is intended to present relevant concepts in a specific manner.

In the present application, the terms such as superior, inferior, anterior, posterior, lateral and medial are used as anatomical concepts in terms of meaning. The anatomical terms of location are standard terms used in anatomy for describing the relative location of a human organ and the direction of movement, based on the standard anatomical position with the hands at the sides of a body and the palms facing forwards.

Some anatomical terms are listed below, most of which will appear hereinafter.

Anatomical planes of human body: sagittal plane, transverse plane (also referred to as horizontal plane), and coronal plane.

In the human anatomy, the following terms of location have the meanings below.

Superior: close to the head. It is also referred to as a proximal side in the description of limbs. It is further referred to as a dorsal side in the sense of the foot.

Inferior: close to the foot. It is also referred to as a distal side in the description of the limbs. It is further referred to as a plantar side in the sense of the foot.

Anterior: close to the abdomen. It is also referred to as a palmar side in the sense of the palm.

Posterior: close to the back. It is also referred to as a back side in the sense of the palm.

Medial: close to the midsagittal plane. It is also referred to as an ulnar side in the description of the forearm, and as a tibial side in the description of the lower leg.

Lateral: away from the midsagittal plane. It is also referred to as a radial side in the description of the forearm, and as a fibular side in the description of the lower leg.

Proximal: a part of the limbs close to the torso.

Distal: a part of the limbs away from the torso.

In the description of topical organs, there are the followings as well.

Interior: close to the inner cavity.

Exterior: away from the inner cavity.

Superficial: close to the body or surface.

Deep: away from the body or surface.

The following will briefly describe the application field of the present application at first.

An implantable neural stimulation system mainly includes a stimulator implanted into the body of a patient and a program-controlled device arranged outside the body of the patient. An existing neuromodulation technology mainly involves implanting an electrode in a specific in vivo structure (i.e., a target) by means of a stereotaxis surgery, and releasing electrical pulses to a target via the stimulator implanted in the body of the patient to modulate the electrical activities of a corresponding neural structure and network, thereby alleviating symptoms and relieving pains. The stimulator may be any one of an implantable electrical nerve stimulation apparatus, an implantable electric cardiac stimulation system (also known as a cardiac pacemaker), an implantable drug delivery system (IDDS) and a lead transfer apparatus. The implantable electrical nerve stimulation apparatus is, for example, a deep brain stimulation (DBS) system, an implantable cortical nerve stimulation (CNS) system, an implantable spinal cord stimulation (SCS) system, an implantable sacral nerve stimulation (SNS) system, an implantable vagus nerve stimulation (VNS) system, etc.

The stimulator may include an implantable pulse generator (IPG), an extension lead, and an electrode lead. The IPG is disposed in the body of the patient and provides controllable electric stimulation energy to in vivo tissues depending on a sealed battery and a sealed circuit. By means of the implanted extension lead and the electrode lead, one or two controllable specific electrical stimulations are delivered to a specific region of in vivo tissues. The extension lead is used in combination with the IPG, and acts as a medium for transmitting electrical stimulation signals to transmit electric stimulation signals generated by the IPG to the electrode lead. The electrode lead delivers electrical stimulations to the specific region of in vivo tissues by means of a plurality of electrode contacts. The stimulator is provided with one or more electrode leads at single side or two sides. The electrode lead is provided with a plurality of electrode contacts, which can be circumferentially arranged uniformly or non-uniformly on the electrode lead. As an example, the electrode contacts may be circumferentially arranged on the electrode lead in an array of four rows and three columns (12 electrode contacts in total). The electrode contacts may include stimulation electrode contacts and/or acquisition electrode contacts. The electrode contacts may be in the shape of, for example, a sheet, a ring, a dot, etc.

In some possible embodiments of the present disclosure, the stimulated in vivo tissue may be a brain tissue of the patient, and the stimulated site may be a specific site of the brain tissue. In the case of different types of diseases among the patients, the stimulated site is generally different, and the number of stimulation contacts (of single source or multiple sources) used, the application of one or more (single-channel or multi-channel) specific electrical stimulation signals, and stimulation parameter data are also different. The types of applicable diseases are not limited in the present application, and may be those to which DBS, SCS, pelvic stimulation, gastric stimulation, peripheral nerve stimulation, and functional electrical stimulation apply. The types of diseases that DBS can be used to treat or manage include, but are not limited to, spastic disorders (for example, epilepsy), pains, migraine, mental disorders (for example, major depressive disorder (MDD)), manic-depressive psychosis, anxiety disorder, post-traumatic stress physiological disorder, dysthymic disorder, obsessive-compulsive disorder (OCD), behavioral disorder, emotional disorder, memory disorder, physiological state disorder, dyskinesia (for example, essential tremor and Parkinson's disease), Huntington's disease, Alzheimer's disease, drug addiction, autism, or other neurological or psychiatric diseases and impairments. When used in the treatment of drug addicts, DBS can help drug addicts detox and improve their sense of happiness and quality of life.

In the present application, when the program-controlled device and the stimulator establish a program-controlled connection, the stimulation parameters of the stimulator (different stimulation parameters corresponding to different electrical stimulation signals) can be adjusted by using the program-controlled device; or bioelectrical activities of the deep brain of the patient can be sensed by means of the stimulator, whereby the stimulation parameters of the electrical stimulation signals of the stimulator can be adjusted continuously by means of the sensed bioelectrical activities.

The program-controlled device may be a physician program controller or a patient program controller.

The data interaction between the physician program controller and the stimulator is not limited in the present application. When a physician performs remote program control, the physician program controller can perform data interaction with the stimulator via a server and the patient program controller. When the physician performs face-to-face program control on the patient offline, the physician program controller can perform data interaction with the stimulator via the patient program controller, and the physician program controller may also perform data interaction with the stimulator directly.

The patient program controller may include a master unit in communication with the server and a slave unit in communication with the stimulator, and the master unit and the slave unit are communicably connected. The physician program controller may perform data interaction with the server over a 3G/4G/5G network; the server may perform data interaction with the master unit over the 3G/4G/5G network; the master unit may perform data interaction with the slave unit via the Bluetooth protocol/WIFI protocol/USB protocol; the slave unit may perform data interaction with the stimulator at the working frequency band of 401 MHz-406 MHz/2.4 GHz-2.48 GHz; and the physician program controller may perform data interaction with the stimulator at the working frequency band of 401 MHz-406 MHz/2.4 GHz-2.48 GHz.

The following will introduce the background of the invention of the present application.

Drug abuse and drug dependence are serious social problems faced by the whole world. The drug problem causes hundreds of thousands of deaths every year as well as many criminal cases, which seriously affects the public order in various countries across the world. Therefore, the treatment of drug addiction is generally highly demanded in every country. The basic therapy for the drug addiction involves two aspects, namely detoxification and relapse prevention. At present, the existing treatment means show a good detoxification effect, but are helpless for the psychological dependence induced by drugs. They cannot effectively prevent relapse, and patients in most cases are trapped in the vicious circle of "drug addiction-detoxification-relapse". The key to relapse prevention lies in whether the psychological craving of a drug addict for drugs can be effectively suppressed.

The studies of the inventor have shown that the reward circuit of a midbrain-limbi-cortex system is closely related to the addictive behaviors, depressive disorders, and obsessive-compulsive disorders. On the basis of years of clinical experience of surgical operation intervention in addictions and the progress of addiction studies in China and abroad, the inventor invents a theory of preventing drug addiction relapse by performing combined electrical stimulation on the nucleus accumbens and the anterior limb of the internal capsule. The image locating of the two targets (namely, the nucleus accumbens and the anterior limb of the internal capsule), and the surgical planning of pathway for implanting the stimulation electrode are the core prerequisites of the treatment.

An anterior limb of an internal capsule is located on each side of the brain, and runs between the lateral putamen and the medial caudate nucleus, with the nucleus accumbens on the ventromedial side. The anterior limb of the internal capsule consists of ascending and descending white matter fiber tracts, and links the prefrontal lobe, the corpus striatum, the thalamus, the brain stem, the cerebellum, and the spinal cord. It is involved in the occurrence and development of the emotion, cognition, decision making and mental disorders. The anterior limb of the internal capsule is one of the targets for an ablative procedure to treat mental disorders. A prefrontal lobe region, to which the white matter fiber tracts running in the anterior limbs of internal capsule are projected, is associated with the arrangement pattern of the white matter fiber tracts in the anterior limbs of internal capsule from the ventral side to the dorsal side and from the medial side to the lateral side. The segmentation and refinement of the anterior limb of the internal capsule are prerequisites for improving the efficacy of DB S in the treatment of mental disorders.

As shown in FIG. 15, the anterior limb of the internal capsule can be segmented into a plurality of regions (for example, 2, 3, 4, 6, 12, 18, 24 regions and others). The white matter fibers running in different regions are projected to different regions in the prefrontal lobe, and different regions in the prefrontal cortex are involved in different functions and different symptoms of the mental disorder in human.

The present application clarifies hereinafter the planning steps and the pathway for the intervention sites in the nucleus accumbens and the anterior limb of the internal capsule on the basis of brain imaging.

Referring to FIG. 1, it shows a structural block diagram of a surgical system according to the present application.

The surgical system includes:

a pathway planning apparatus 10 for planning a pathway for implanting an electrode lead into a brain of a patient; and a surgical apparatus 20 for executing a surgical operation of implanting the electrode lead into the brain of the patient according to the pathway, such that the electrode lead makes contact with an anterior limb of an internal capsule and a nucleus accumbens in one hemisphere of the brain of the patient, wherein the electrode lead is configured to deliver an electrical stimulation to the anterior limb of the internal capsule and the nucleus accumbens.

Accordingly, the electrode lead is implanted into the brain of the patient according to the planned pathway by executing an implantation surgery via the surgical apparatus 20.

In some possible embodiments, the electrode lead making contact with the anterior limb of the internal capsule and the nucleus accumbens refers to the electrode lead passing through the anterior limb of the internal capsule and the nucleus accumbens from superior to inferior, from anterior to posterior and from lateral to medial; and the patient suffers from a disease including one or more of the following mental disorders: depressive disorder, manic-depressive psychosis, anxiety disorder, post-traumatic stress psychological disorder, obsessive-compulsive disorder, behavior disorder, emotional disorder, memory disorder, psychological state disorder, drug addiction, and autism.

The surgical apparatus 20 is not limited in the present application. The surgical apparatus 20 may include, for example, one or more of a surgery guide assembly, a drive assembly, a patient fixation assembly, and an operating table. The method of executing a surgery by the surgical apparatus 20 is not limited in the present application. The surgical apparatus 20 may automatically executes surgical steps according to a preset surgical plan, or execute the surgical steps under the control of a physician.

In some possible embodiments of the present disclosure, the surgical system may further include a medical imaging device, which is configured to acquire image data of the patient. The image data here refers to medical image data. The medical imaging device may include, for example, one or more of a CT device, a MR device, a PET device, a PET-CT device, and a PET-MR device. Correspondingly, the image data may include, for example, one or more of CT image data, MR image data, PET image data, PET-CT image data, and PET-MR image data. Among them, CT refers to computed tomography, MR refers to magnetic resonance, and PET refers to positron emission tomography.

In some possible embodiments of the present disclosure, the pathway planning apparatus may be combined/integrated with the surgical apparatus 20 as a whole.

In the present application, the pathway planning apparatus 10 may be configured to implement the steps of the pathway planning method, which will be described first hereinafter.

Referring to FIG. 2, it shows a schematic flow chart of a pathway planning method according to the present application.

The method includes the following steps.

Step S101, planning a pathway for implanting an electrode lead into a brain of a patient, wherein the planned pathway satisfies the following condition: if the electrode lead is implanted into the brain of the patient according to the pathway, the electrode lead is capable of simultaneously making contact with an anterior limb of an internal capsule and a nucleus accumbens in one hemisphere of a brain of the patient, and the electrode lead is configured to deliver an electrical stimulation to the anterior limb of the internal capsule and the nucleus accumbens.

Accordingly, a specific implantation pathway is planned for the electrode lead, and the electrode lead is implanted into one hemisphere (for example, a left hemisphere or a right hemisphere) of the brain of the patient according to this pathway, such that the combined electrical stimulation can be performed on the nucleus accumbens and the anterior limb of the internal capsule in this hemisphere for treating the patient.

The pathway planned by the pathway planning method enables the electrode lead simultaneously make contact with the anterior limb of the internal capsule and the nucleus accumbens in one hemisphere. In this way, the electrode lead is capable of simultaneously delivering the electrical stimulation to the anterior limb of the internal capsule and the nucleus accumbens, such that a combined electrical stimulation therapy is achieved.

In the field of DBS, a physician used to perform an electrical stimulation therapy on a specific brain tissue. As a result, after an electrode lead is implanted into the brain of the patient, it is impossible to simultaneously deliver electrical stimulations to a plurality of brain tissues, let alone a combined electrical stimulation therapy for two specific brain tissues (i.e., the anterior limb of the internal capsule and the nucleus accumbens), even though the electrode lead may be provided with a plurality of electrode slices which however are configured to deliver electrical stimulations to the same brain tissue (a nucleus mass).

The pathway planning method according to the present application can plan an implantation pathway for the electrode lead, such that, after the electrode lead is implanted into the brain of the patient, the combined electrical stimulation therapy can be performed on the anterior limb of the internal capsule and the nucleus accumbens in one hemisphere of the brain, showing a better effect of treating diseases such as addiction behaviors, depressive disorders, and obsessive-compulsive disorders.

In some possible embodiments of the present disclosure, the electrode lead making contact with the anterior limb of the internal capsule and the nucleus accumbens refers to the electrode lead passing through the anterior limb of the internal capsule and the nucleus accumbens from superior to inferior, from anterior to posterior and from lateral to medial; and the patient suffers from a disease including one or more of the following mental disorders: depressive disorder, manic-depressive psychosis, anxiety disorder, post-traumatic stress psychological disorder, obsessive-compulsive disorder, behavior disorder, emotional disorder, memory disorder, psychological state disorder, drug addiction, and autism.

Accordingly, the electrode lead is allowed to pass through the anterior limb of the internal capsule and the nucleus accumbens along a specific direction, and the combined electric stimulation therapy for the anterior limb of the internal capsule and the nucleus accumbens is used for treating diseases of a specific type, for example for treating a variety of mental disorders, such that the condition of the patient can be effectively alleviated, and the disease of the patient can even be cured.

In each hemisphere of the brain, one or more electrode leads may be implanted according to the pathway described above.

Referring FIG. 3, it shows a schematic flow chart of planning a pathway according to the present application. In some possible embodiments of the present disclosure, step S101 may include:

step S201, acquiring image data of the brain of the patient;

step S202, locating an extremum point of a ventral contour of the nucleus accumbens on the basis of the image data to obtain location data of the extremum point; and step S203, planning, on the basis of the location data of the extremum point, a pathway for implanting the electrode lead into the brain of the patient, such that a straight line where the pathway is located passes the extremum point from superior to inferior, from anterior to posterior and from lateral to medial.

Accordingly, the extremum point of the ventral contour of the nucleus accumbens is located by using the image data, and the implantation pathway of the electrode lead is planned by using the extremum point, such that the straight line where the planned pathway is located passes the extremum point.

In some possible embodiments, a process of determining the straight line includes:

locating a set point of the anterior limb of the internal capsule on the basis of the image data to obtain location data of the set point; and determining the straight line on the basis of the location data of the set point and the location data of the extremum point, such that the straight line passes the set point and the extremum point.

Accordingly, a constrain on the pathway is created by using the set point of the anterior limb of the internal capsule and the extremum point of the nucleus accumbens, and the implantation pathway of the electrode lead is obtained by planning in a two-point defining one-line manner, such that the electrode lead passes through the anterior limb of the internal capsule and the nucleus accumbens in a sequential order during the process of implanting from superior to inferior, from anterior to posterior and from lateral to medial.

Specifically, the projection relation between each region and the prefrontal lobe is clarified on the basis of the segmentation of the anterior limb of the internal capsule, in order to determine a specific coordinate point during the DBS intervention of the anterior limb of the internal capsule, such that a one-line, defined by two-point, electrode pathway planning can be achieved between the nucleus accumbens and the anterior limb of the internal capsule.

When a target of the anterior limb of the internal capsule is defined, the target can be set, according to the individual differences of the patient's symptoms, as: the white matter fiber tracts running over in this region being projected to a particular prefrontal cortex associated with the patient's symptom.

In some possible embodiments, locating the set point of the anterior limb of the internal capsule on the basis of the image data includes:

acquiring a segmentation result of the anterior limb of the internal capsule on the basis of the image data, wherein the segmentation result of the anterior limb of the internal capsule is used to indicate a plurality of regions of the anterior limb of the internal capsule;

determining one region (from the plurality of regions) as a region of interest on the basis of a mapping/projecting relation between each region and a prefrontal lobe, such that a white matter fiber tract running over the region of interest can be mapped/projected to a prefrontal cortex of interest, wherein the prefrontal cortex of interest refers to a prefrontal cortex associated with the disease of the patient; and locating, from the region of interest, the set point of the anterior limb of the internal capsule.

Accordingly, the segmentation result of the anterior limb of the internal capsule is acquired by using the image data, and the set point of the anterior limb of the internal capsule is then located by using the segmentation result of the anterior limb of the internal capsule, such that, when the implantation pathway passes the set point, the electrode lead can release the energy of electrical stimulation to a portion (i.e., the region of interest), in contact with the electrode lead, of the anterior limb of the internal capsule. This energy is projected to the prefrontal cortex of interest via the white matter fiber tract of the region of interest, and precisely acts on the specific prefrontal cortex associated with the disease of the patient, thereby realizing precise treatment of mental disorders.

In some possible embodiments of the present disclosure, a process of determining the straight line includes:

making the straight line be within a reference plane with an acute angle, formed between the straight line and any one transverse plane of the brain, being equal to a second preset angle, wherein the reference plane satisfies the following condition: the extremum point is within the reference plane, and an acute angle formed by the reference plane and any one sagittal plane of the brain is equal to a first preset angle, and a normal line of the reference plane is parallel to any one coronal plane of the brain.

In mathematics, an extremum is a general term for maximum and minimum, and it means the function value of a point at which a function achieves the maximum or minimum in a field. The point where the function achieves the extremum is called an extremum point. This field may be either a neighborhood field or a whole function field (in this case, the extremum is called the extreme value, the global extremum, and the absolute extremum).

The location data is not limited in the present application. The location data may be, for example, coordinate data, and a coordinate system used may be, for example, a Cartesian rectangular coordinate system, a plane polar coordinate system, a cylindrical plane coordinate system (or a cylindrical coordinate system), or a spherical plane coordinate system (or a spherical coordinate system). In practical use, one or more coordinate systems may be established according to the requirement of a surgical operation of a physician, and a mapping relation between the plurality of coordinate systems may be established for executing the surgical operation.

Accordingly, the straight line at which the pathway is located is disposed within a specific reference plane, and forms a specific acute angle (i.e., the second preset angle) with any one transverse plane of the brain.

To set the reference plane, a plurality of conditions need to be satisfied as follows: the extremum point must be within the reference plane; the reference plane and any one sagittal plane form a specific acute angle (i.e., the first preset angle); and the normal line of the reference plane is parallel to the coronal plane, that is, a projection of the reference plane on the coronal plane is a straight line.

In this way, the straight line where the planned pathway is located may pass through the anterior limb of the internal capsule and the nucleus accumbens along a specific direction and at a specific angle. Therefore, the electrode lead implanted according to such a pathway can pass through the anterior limb of the internal capsule and the nucleus accumbens along a specific direction and at a specific angle, thereby achieving the combination electric stimulation therapy for these two brain tissues.

In some possible embodiments of the present disclosure, the first preset angle is not less than 5 degrees and not greater than 85 degrees, and the second preset angle is not less than 15 degrees and less than 90 degrees.

Accordingly, since the brain structure varies from person to person and each person differs in brain structure, the value of each of the first preset angle and the second preset angle may be within a wide value range, as long as the combination electrical stimulation can be performed on the anterior limb of the internal capsule and the nucleus accumbens in one hemisphere of the brain of the patient.

In some possible embodiments, the first preset angle is not less than 15 degrees and not greater than 45 degrees, and the second preset angle is not less than 40 degrees and not greater than 85 degrees.

Accordingly, although each person differs in brain structure, most people have a relatively similar brain structure; in terms of probability, a relatively accurate angle range can be preferably used to quickly determine the direction of the implantation pathway, which is sufficient to deal with the normal condition of most people; and for a small subset of people whose brain structures significantly differ from those of ordinary people, a wider range can be used as an alternative for helping a physician to plan a pathway for implanting the electrode lead.

In some possible embodiments, a process of determining the first preset angle and the second preset angle includes:
locating a set point of the anterior limb of the internal capsule on the basis of the image data to obtain location data of the set point; and
determining the first preset angle and the second preset angle on the basis of the location data of the set point and the location data of the extremum point.

Accordingly, before the implantation pathway is determined by using the first preset angle, the second preset angle and the extremum point, taking the set point of the anterior limb of the internal capsule and the extremum point of the nucleus accumbens as constraints greatly reduces the value ranges of the first and second preset angles, as well as the range of the implantation pathway of the electrode lead during an implantation process, in particular when the values of the first and second preset angles can be within a wider value range, such that the data volume of all the feasible solutions of the first and second preset angles can be greatly decreased.

In some possible embodiments, a process of determining the first preset angle and the second preset angle includes:
acquiring a segmentation result of the anterior limb of the internal capsule on the basis of the image data, wherein the segmentation result of the anterior limb of the internal capsule is used to indicate a plurality of regions of the anterior limb of the internal capsule;
determining one region (from the plurality of regions) as a region of interest on the basis of a mapping relation between each region and a prefrontal lobe to obtain location data of the region of interest, such that a white matter fiber tract running over the region of interest can be mapped to a prefrontal cortex of interest, wherein the prefrontal cortex of interest refers to a prefrontal cortex associated with the disease of the patient; and
determining the first preset angle and the second preset angle on the basis of the location data of the region of interest and the location data of the extremum point.

In some other possible embodiments, step S101 may include:
acquiring image data of the brain of the patient;
acquiring the location data of the anterior limb of the internal capsule and the location data of the nucleus accumbens on the basis of the image data;
planning, on the basis of the location data of the anterior limb of the internal capsule and the location data of the nucleus accumbens, a pathway for implanting the electrode lead into the brain of the patient, such that a straight line where the pathway is located passes the anterior limb of the internal capsule and the nucleus accumbens, from superior to inferior, from anterior to posterior and from lateral to medial.

In some other possible embodiments, step S101 may include:
acquiring image data of the brain of the patient;
acquiring the contour data of the anterior limb of the internal capsule and the contour data of the nucleus accumbens on the basis of the image data; and
planning the pathway for implanting the electrode lead into the brain of the patient by using spatial constraint on a pathway formed by the contour data of the anterior limb of the internal capsule and the contour data of the nucleus accumbens, such that a straight line where the pathway is located passes the anterior limb of the internal capsule and the nucleus accumbens from superior to inferior, from anterior to posterior and from lateral to medial.

In some other possible embodiments, step S101 may include:
acquiring image data of the brain of the patient;
acquiring the contour data of the anterior limb of the internal capsule, the contour data of the nucleus accumbens, and the contour data of the caudate nucleus, putamen and medial diagonal band in the same hemisphere as the anterior limb of the internal capsule and the nucleus accumbens on the basis of the image data; and
planning the pathway for implanting the electrode lead into a brain of the patient by using a spatial constraint on a pathway formed by the contour data of the anterior limb of the internal capsule, the contour data of the nucleus accumbens, the contour data of the caudate nucleus, the contour data of the putamen, and the contour data of the medial diagonal band, such that a straight line where the pathway is located passes the anterior limb of the internal capsule and the nucleus accumbens from superior to inferior, from anterior to posterior and from lateral to medial.

In some other possible embodiments, step S101 may include:
acquiring image data of the brain of the patient;
acquiring a three-dimensional model of the brain of the patient on the basis of the image data;
planning the pathway for implanting the electrode lead into the brain of the patient by using a spatial constraint on the pathway formed by a contour of the anterior limb of the internal capsule and the contour of the nucleus accumbens in the three-dimensional model, such that a straight line where the pathway is located passes the anterior limb of the internal capsule and the nucleus accumbens from superior to inferior, from anterior to posterior and from lateral to medial.

Referring to FIG. 4 and FIG. 5, FIG. 4 shows a portion of a two-dimensional image of a coronal plane of a brain according to the present application, and FIG. 5 shows a schematic flow chart of locating an extremum point according to the present application. FIG. 4 shows the positions of the caudate nucleus, putamen, nucleus accumbens, anterior limb of the internal capsule and medial diagonal band.

In some possible embodiments, step S202 may include:
step S301, locating a reference point on the basis of the image data, and generating a two-dimensional image of the brain corresponding to the reference point, wherein the two-dimensional image of the brain corresponding to the reference point includes one or more of a two-dimensional image of a coronal plane, a two-dimensional image of a sagittal plane, and a two-dimensional image of a transverse plane; and
step S302, locating the extremum point of the ventral contour of the nucleus accumbens by using the two-dimensional image of the brain corresponding to the reference point.

Accordingly, the reference point is located by using the image data, wherein the reference point may be, for example, an anterior commissure, a posterior commissure, or a midpoint between the two in the brain; after the reference point is located, the coronal plane, sagittal plane, and transverse plane of the brain corresponding to the reference point, i.e., the coronal plane (in other words, the reference point is within the coronal plane), sagittal plane, and transverse plane passing through the reference point, can be located, and one or more of the two-dimensional images corresponding to the coronal plane, sagittal plane, and transverse plane are generated by using three-dimensional image data; and since the ventral contour of the nucleus accumbens has a parabola-like shape (the opening of the parabola is upward and outward) presented in the above two-dimensional image, the extremum point (i.e., the vertex of the parabola) of the ventral contour of the nucleus accumbens can be located therefrom, and the step of locating the extremum point can be implemented by intelligent identification or manual calibration.

For a physician, such a method for locating the extremum point is very visual and can be quickly calibrated by experience.

Furthermore, by means of intelligent identification, an edge detection algorithm and/or an image segmentation algorithm may also be used to quickly identify the contour of the nucleus accumbens, such that the extremum point of the ventral contour of the nucleus accumbens is located. Algorithm models corresponding to the edge detection algorithm and the image segmentation algorithm may be pre-trained algorithm models. These trained algorithm models may be obtained by training in a supervised learning manner, or in a semi-supervised learning manner, or in an unsupervised learning manner.

In the pathway planning method according to the present application, the two-dimensional image is generated by using the reference point, and the extremum point is located by using the two-dimensional image. Such a method of locating the extremum point is simple in computing process, low in computing load, and high in computing speed, and also has fewer computing resources consumed.

The parabola is an axisymmetric figure, and its axis of symmetry is called axis for short. A point at which the parabola intersects with its axis is called the vertex of the parabola.

In some possible embodiments, the reference point is a midpoint of a connecting line between an anterior commissure and a posterior commissure of the brain; or
the reference point is the anterior commissure of the brain; or
the reference point is the posterior commissure of the brain.

Accordingly, by taking the anterior commissure, the posterior commissure, or the midpoint of the connecting line between the anterior commissure and the posterior commissure as a reference point, the advantages of simple operation and easy implementation are achieved, regardless of whether the intelligent identification mode or the manual calibration mode is used. For a physician, such a method of locating the reference point is very visual, and can be quickly calibrated by experience. Furthermore, by means of intelligent identification, the edge detection algorithm may also be used to quickly obtain the contour of the entire brain, the anterior commissure and the posterior commissure can be quickly located therefrom, such that the reference point is located.

In the present application, the anterior commissure is also known as the precommissure, and both have the same meaning; and similarly, the posterior commissure is also known as the postcommissure, and both have the same meaning.

Figure 6:
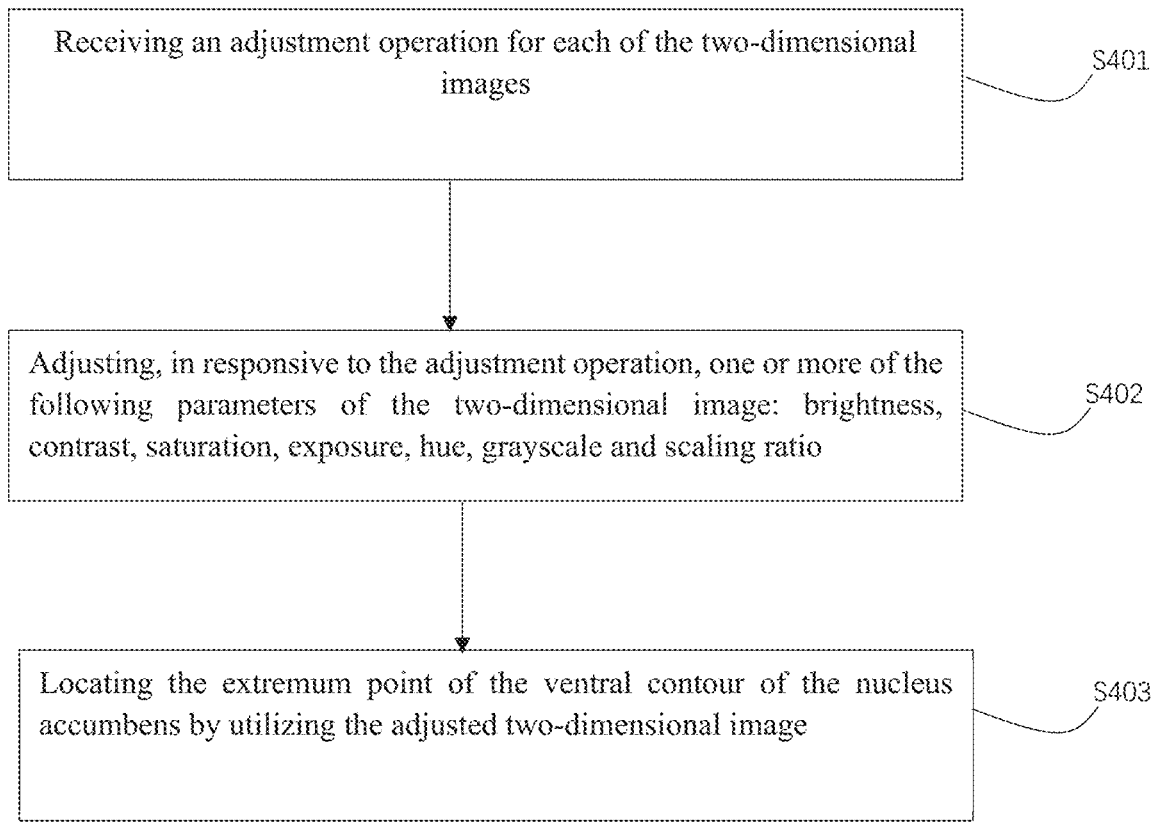
FIG. 6 shows another schematic flow chart of locating an extremum point according to another embodiment of the present application.

Referring to FIG. 6, it shows another schematic flow chart of locating an extremum point according to the present application.

In some possible embodiments, step S302 may include:
step S401, receiving an adjustment operation for each of the two-dimensional images;
step S402, adjusting, in responsive to the adjustment operation, one or more of the following parameters of the two-dimensional image: brightness, contrast, saturation, exposure, hue, grayscale, and scaling ratio; and
step S403, locating the extremum point of the ventral contour of the nucleus accumbens by using the adjusted two-dimensional image.

Accordingly, a physician can manually adjust the parameters of the two-dimensional images, and adjusting the parameters can lead to a change in the display effect of the two-dimensional image, which facilitates the determination of the extremum point therefrom.

The parameters adjusted are not limited in the present application, and may be, for example, one or more of a plurality of parameters that affect a display effect.

Obviously, the adjustment of one or more of these parameters enables the ventral contour of the nucleus accumbens to be more prominent and clearer (or in other words, with higher contrast), which makes the located extremum point more precise and reliable with higher locating speed and high locating efficiency, such that the efficiency of pathway planning is improved as a whole.

The purpose of such adjustment of the parameters is to present the border or contour (including the ventral, dorsal, medial, lateral, anterior, and posterior sides) of the nucleus accumbens more clearly, such that an incompletely visible contour before adjustment is transformed into a relatively clear contour after adjustment, which facilitates the locating of a ventral extremum point (i.e., the extremum point of the ventral contour of the nucleus accumbens).

In some possible embodiments, step S401 may include: displaying the two-dimensional image by using an interactive device; and receiving an adjustment operation for the two-dimensional images by using the interactive device.

In some possible embodiments, the interactive device has a display assembly and a touch assembly. The interactive device may be, for example, a mobile phone, a tablet computer, a notebook computer, a desk computer, or other intelligent terminal devices.

In some possible embodiments, the adjustment operation is an operation of adjusting a parameter curve, and is configured to adjust the brightness, contrast, or grayscale of the two-dimensional image; or the adjustment operation is an operation of adjusting a parameter progress bar, and is configured to adjust the brightness, contrast, saturation, exposure, hue, grayscale, and scaling ratio of the two-dimensional image; or the adjustment operation is an operation of adjusting a parameter value, and is configured to adjust the brightness, contrast, saturation, exposure, hue, grayscale, and scaling ratio of the two-dimensional image.

Accordingly, the physician is allowed to adjust the brightness or contrast by adjusting the parameter curve, or to adjust a variety of parameters by adjusting the parameter progress bars, or to adjust a variety of parameters by adjusting the parameter values, such that the physician can choose a parameter adjustment mode on the basis of personal preference in order to quickly adjust the display effect of the two-dimensional image, thereby further improving the efficiency of pathway planning.

When the adjustment operation is an operation of adjusting a parameter curve, a plurality of regions in the two-dimensional image can be discriminatively adjusted in brightness, contrast, and grayscale, in order to highlight a contour region of the nucleus accumbens in the two-dimensional image. That is to say, in some possible embodiments, some of the regions may be increased in brightness while other regions may be decreased in brightness; and/or, some of the regions may be increased in contrast while other regions may be decreased in contrast; and/or, some of the regions may be increased in grayscale while other regions may be decreased in grayscale.

Figure 7:
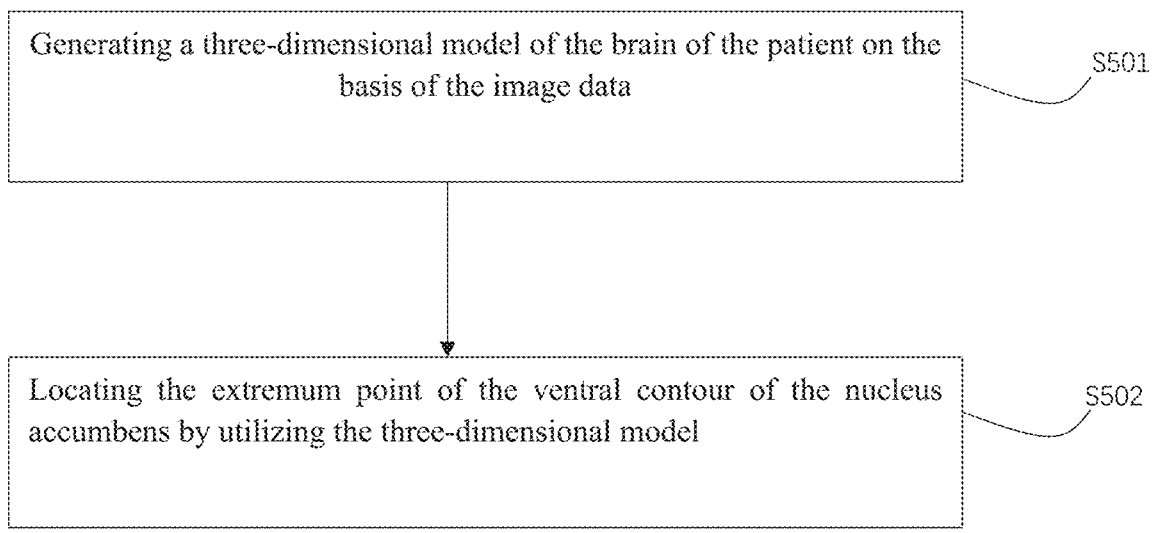
FIG. 7 shows a yet another schematic flow chart of locating an extremum point according to a yet another embodiment of the present application.

Referring FIG. 7, it shows a yet another schematic flow chart of locating an extremum point according to the present application. In some other possible embodiments, step S202 may include:

step S501, generating a three-dimensional model of the brain of the patient on the basis of the image data; and step S502, locating the extremum point of the ventral contour of the nucleus accumbens by using the three-dimensional model.

Accordingly, the three-dimensional model of the brain is generated by using the image data, the extremum point is then located by means of the three-dimensional model, and the extremum point can be located in a manner of intelligent identification or manual calibration.

When manual calibration is used, the three-dimensional model has visuality stronger than that of the image data and the two-dimensional image, and the physician may calibrate the extremum point more conveniently and quickly.

When intelligent identification is used, compared with the image data and the two-dimensional image (the image data and the two-dimensional image often needing to be completed by means of an interpolation algorithm so as to obtain the extremum point), the three-dimensional model has a continuous shape (or contour), and can perform computation quickly to obtain the extremum point without needing of completing the data, and it is low in computing load, high in computing speed, and high in computing efficiency, and also has fewer computing resources consumed.

In some other possible embodiments, step S101 may include:

generating a three-dimensional model of the brain of the patient on the basis of the image data;

displaying the three-dimensional model by using a display device, wherein the three-dimensional model includes a three-dimensional structure of the nucleus accumbens and a three-dimensional structure of the anterior limb of the internal capsule; and receiving a pathway planning operation by using an interactive device, and in response to the pathway planning operation, planning the pathway.

Accordingly, the nucleus accumbens and the anterior limb of the internal capsule can be simultaneously displayed in the three-dimensional model, such that the physician is capable of designing a surgical pathway according to the displayed three-dimensional structures of two targets (i.e., the nucleus accumbens and the anterior limb of the internal capsule).

The interactive device is not limited in the present application. The interactive device may be, for example, a mobile phone, a tablet computer, a notebook computer, a desk computer, an intelligent wearable device, or other intelligent terminal devices; or, the interactive device may be a console or a workstation.

The way of receiving various (manual) operations by using the interactive device is not limited in the present application. The operations are divided by an input mode, and for example, may include a text input operation, an audio input operation, a video input operation, a key operation, a knob operation, a mouse operation, a keyboard operation, an intelligent stylus operation, etc.

The above display device and interactive device may be combined or integrated as a whole. For example, a touch display device, namely, a tablet computer, a smart screen, a smart phone, a notebook computer having a touch screen, etc., may be used.

Referring to FIG. 8, it shows another schematic flow chart of planning a pathway according to the present application. In some other possible embodiments, step S202 may include:

step S601, acquiring the contour data of the anterior limb of the internal capsule on the basis of the image data; and step S602, performing planning by using a spatial constraint on the pathway formed by the contour data of the anterior limb of the internal capsule and on the basis of the location data of the extremum point to obtain the pathway, such that the electrode lead sequentially passes through the anterior limb of the internal capsule and the nucleus accumbens during the implantation process.

Accordingly, the contour data of the anterior limb of the internal capsule is acquired by using the image data, the constraint on the pathway formed by the contour data of the anterior limb of the internal capsule is utilized, and in combination with the location data, the implantation pathway of the electrode lead is planned, such that the electrode lead passes through the anterior limb of the internal capsule and the nucleus accumbens in sequential order during the process of implanting from superior to inferior, from anterior to posterior and from lateral to medial.

That is to say, before the implantation pathway is determined by using the first preset angle, the second preset angle and the extremum point, taking the contour of the anterior limb of the internal capsule as the constraint greatly reduces the range of the implantation pathway of the electrode lead during an implantation process, in particular when the values of the first and second preset angles can be within a wider value range, such that the data volume of all the feasible solutions can be greatly decreased.

Figure 10:
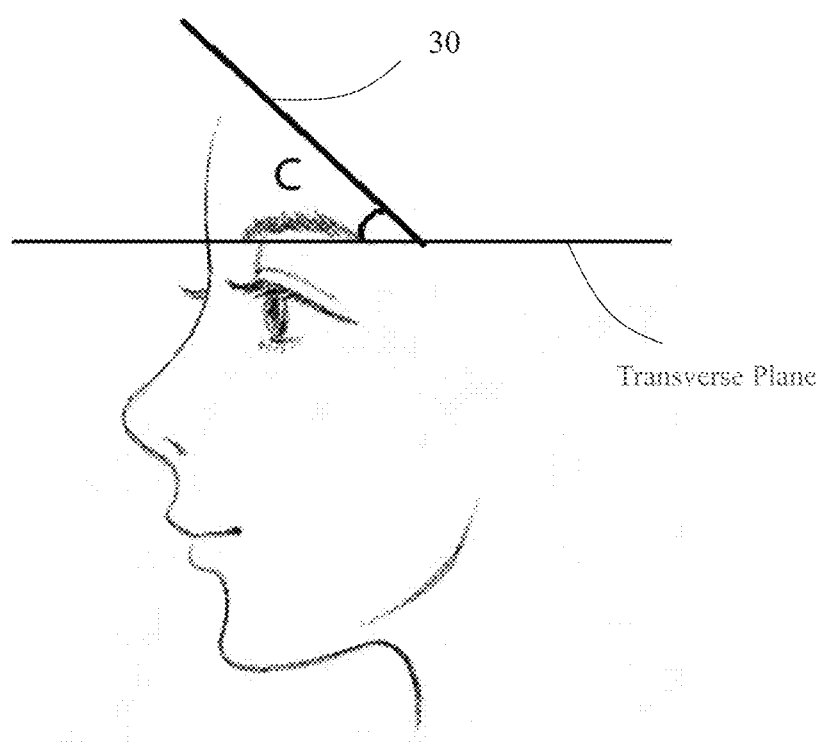
FIG. 10 shows a schematic structural diagram of a brain from a view angle of sagittal plane according to the present application.
Figure 11:
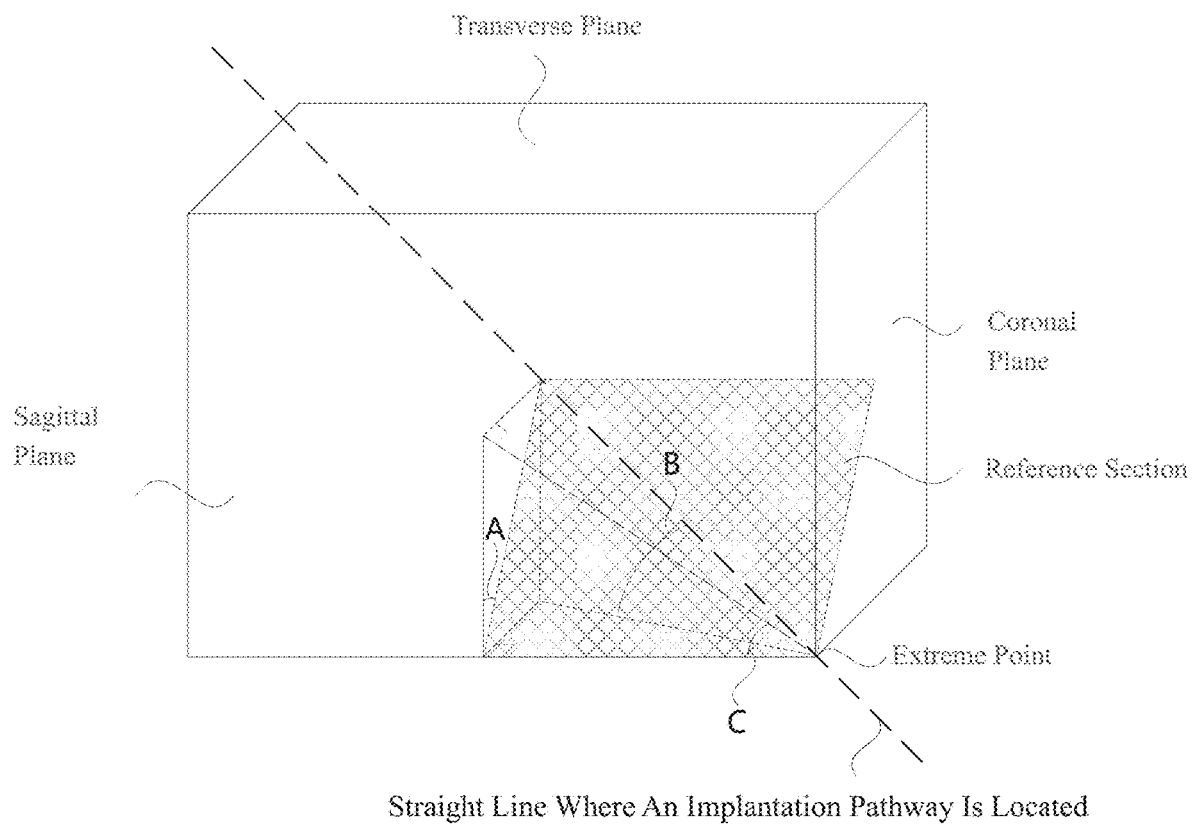
FIG. 11 shows a diagram of a spatial position relation between a second preset angle and a third preset angle according to an embodiment of the present application.

Referring to FIG. 9 to FIG. 11, FIG. 9 shows a schematic structure diagram of a brain and an electrode lead 30 from a view angle of coronal plane according to the present application; FIG. shows a schematic structural diagram of a brain and the electrode lead 30 from a view angle of sagittal plane according to the present application; and FIG. 11 shows a diagram of a spatial position relation between a second preset angle and a third preset angle according to the present application. As an example, the first preset angle may be, for example, A in FIG. 9 and FIG. 11, the second preset angle may be, for example, B in FIG. 11, and the third preset angle may be, for example, C in FIG. 10 and FIG. 11.

In some other possible embodiments, step S203 may include:
  locating a reference plane passing the extremum point on the basis of the location data of the extremum point, wherein an acute angle formed by the reference plane and a sagittal plane of the brain is equal to the first preset angle, and a normal line of the reference plane is parallel to a coronal plane of the brain;
  locating an inclined plane passing the extremum point, wherein an angle formed between the inclined plane and any one transverse plane of the brain is equal to the third preset angle, a normal line of the inclined plane is parallel to any one sagittal plane of the brain, and the third preset angle is cooperatively determined by the first preset angle and the second preset angle; and
  determining an intersecting line between the reference plane and the inclined plane as the straight line at which the pathway is located.

Accordingly, the straight line is determined by using the intersecting line of the two planes (namely, the reference plane and the inclined plane), such that the straight line can be quickly determined from the reference plane.

In some other possible embodiments, step S203 may include:
  locating, on the basis of the location data of the extremum point, a cone taking the extremum point as a vertex of the cone, wherein an axis of the cone is perpendicular to the transverse plane of the brain, and an angle formed between a generatrix of the cone and any one transverse plane of the brain is equal to the second preset angle; and
  determining one of two intersecting lines between the cone and the reference plane as the straight line.

Accordingly, a spatial constraint is set to the axis and generatrix of the cone by taking the reference point as the vertex of the (inverted vertical) cone, such that the straight line can be quickly determined.

The present application further provides a pathway planning method, which includes:
  acquiring location data of the nucleus accumbens, caudate nucleus, putamen, anterior limb of the internal capsule, and medial diagonal band in one hemisphere of the brain of a patient according to MR image data and CT image date of the brain of the patient (as long as the approximate positions of the nucleus accumbens, caudate nucleus, putamen, anterior limb of the internal capsule, and medial diagonal band can be acquired);
  setting a midpoint of a connecting line between the anterior commissure and the posterior commissure as a reference point, and acquiring a two-dimensional image of a coronal plane at which the reference point is located;
  adjusting the grayscale and contrast of the two-dimensional image to more clearly determine the position(s) of the one or more functional regions described previously;
  determining the extremum point of the ventral contour of the nucleus accumbens from the two-dimensional image;
  acquiring a midsagittal plane located between both halves of the brain, and locating a plane which points to an extremum point and forms an acute angle, as the first preset angle, with the central midsagittal plane; and
  acquiring a straight line, which forms an acute angle, as the second preset angle, with any one transverse plane, from the plane, wherein the straight line is taken as the straight line at which the pathway for implanting the electrode lead into the brain is located.

The present application further provides a pathway planning apparatus. The specific implementation solution of the pathway planning apparatus achieves the same technical effect as that achieved by the implementation solution recited in the method embodiments described above, and thus, some of the details are not repeated any more.

The pathway planning apparatus includes a processor, which is configured:
  to plan a pathway for implanting an electrode lead into a brain of a patient, wherein the planned pathway satisfies the following condition: if the electrode lead is implanted into the brain of the patient according to the pathway, the electrode lead is capable of simultaneously making contact with an anterior limb of an internal capsule and a nucleus accumbens in one hemisphere of a brain of the patient, and
  wherein the electrode lead is configured to deliver an electrical stimulation to the anterior limb of the internal capsule and the nucleus accumbens.

Accordingly, a specific implantation pathway is planned for the electrode lead, and the electrode lead is implanted into one hemisphere (for example, a left hemisphere or a right hemisphere) of the brain of the patient according to this pathway, such that the combined electrical stimulation can be performed on the nucleus accumbens and the anterior limb of the internal capsule in this hemisphere for treating the patient. The pathway planned by the pathway planning apparatus enables the electrode lead to simultaneously make contact with the anterior limb of the internal capsule and the nucleus accumbens in one hemisphere. In this way, the electrode lead is capable of simultaneously delivering the electrical stimulation to the anterior limb of the internal capsule and the nucleus accumbens, such that a combined electrical stimulation therapy is achieved. In the field of DBS, a physician used to perform an electrical stimulation therapy on a specific brain tissue. As a result, after an electrode lead is implanted into the brain of the patient, it is impossible to simultaneously deliver electrical stimulations to a plurality of brain tissues, let alone a combined electrical stimulation therapy for two specific brain tissues (i.e., the anterior limb of the internal capsule and the nucleus accumbens), even though the electrode lead may be provided with a plurality of electrode slices which however are configured to deliver electrical stimulations to the same brain tissue (a nucleus mass). The pathway planning apparatus according to the present application can plan an implantation pathway of the electrode lead, such that, after the electrode lead is implanted into the brain of the patient, the combined electrical stimulation therapy can be performed on the anterior limb of the internal capsule and the nucleus accumbens in one hemisphere of the brain, showing a better effect of treating diseases such as addiction behaviors, depressive disorders, and obsessive-compulsive disorders.

In some possible embodiments of the present disclosure, the electrode lead making contact with the anterior limb of the internal capsule and the nucleus accumbens refers to the electrode lead passing through the anterior limb of the internal capsule and the nucleus accumbens from superior to inferior, from anterior to posterior and from lateral to medial; and the patient suffers from a disease including one or more of the following mental disorders: depressive disorder, manic-depressive psychosis, anxiety disorder, post-traumatic stress psychological disorder, obsessive-compulsive disorder, behavior disorder, emotional disorder, memory disorder, psychological state disorder, drug addiction, and autism.

Accordingly, the electrode lead is allowed to pass through the anterior limb of the internal capsule and the nucleus accumbens along a specific direction, and the combined electric stimulation therapy for the anterior limb of the internal capsule and the nucleus accumbens is used for treating diseases of a specific type, for example for treating a variety of mental disorders, such that the condition of the patient can be effectively alleviated, and the disease of the patient can even be cured.

In some possible embodiments of the present disclosure, the processor is further configured to plan the pathway by:
  acquiring image data of the brain of the patient, the image data including magnetic resonance image data and/or CT image data;
  locating an extremum point of a ventral contour of the nucleus accumbens on the basis of the image data to obtain location data of the extremum point; and
  planning, on the basis of the location data of the extremum point, a pathway for implanting the electrode lead into the brain of the patient, such that a straight line where the pathway is located passes the extremum point from superior to inferior, from anterior to posterior and from lateral to medial.

Accordingly, the extremum point of the ventral contour of the nucleus accumbens is located by using the image data, and the implantation pathway of the electrode lead is planned by using the extremum point, such that the straight line where the planned pathway is located passes the extremum point.

In some possible embodiments of the present disclosure, the processor is further configured to determine the straight line by:
  locating a set point of the anterior limb of the internal capsule on the basis of the image data to obtain location data of the set point; and
  determining the straight line on the basis of the location data of the set point and the location data of the extremum point, such that the straight line passes the set point and the extremum point.

Accordingly, by utilizing a constrain on the pathway formed by the set point of the anterior limb of the internal capsule and the extremum point of the nucleus accumbens, the implantation pathway of the electrode lead is obtained by planning in a two-point defining one-line manner, such that the electrode lead passes through the anterior limb of the internal capsule and the nucleus accumbens in a sequential order during the process of implanting from superior to inferior, from anterior to posterior and from lateral to medial.

In some possible embodiments of the present disclosure, the processor is further configured to located the set point of the anterior limb of the internal capsule by:
  acquiring a segmentation result of the anterior limb of the internal capsule on the basis of the image data, wherein the segmentation result of the anterior limb of the internal capsule is used to indicate a plurality of regions of the anterior limb of the internal capsule;
  determining one of the regions as a region of interest on the basis of a mapping relation between each region and a prefrontal lobe, such that a white matter fiber tract running over the region of interest can be mapped to a prefrontal cortex of interest, wherein the prefrontal cortex of interest refers to a prefrontal cortex associated with the disease of the patient; and
  locating, from the region of interest, the set point of the anterior limb of the internal capsule.

Accordingly, the segmentation result of the anterior limb of the internal capsule is acquired by using the image data, and the set point of the anterior limb of the internal capsule is then located by using the segmentation result of the anterior limb of the internal capsule, such that, when the implantation pathway passes the set point, the electrode lead can release the energy of electrical stimulation to a portion (i.e., the region of interest), in contact with the electrode lead, of the anterior limb of the internal capsule. This energy is projected to the prefrontal cortex of interest via the white matter fiber tract of the region of interest, and precisely acts on the specific prefrontal cortex associated with the disease of the patient, thereby realizing precise treatment of mental disorders.

In some possible embodiments of the present disclosure, the processor is further configured to determine the straight line by:
  making the straight line be within a reference plane with an acute angle, formed between the straight line and any one transverse plane of the brain, being equal to a second preset angle,
  wherein the reference plane satisfies the following condition: the extremum point is within the reference plane, and an acute angle formed by the reference plane and any one sagittal plane of the brain is equal to a first preset angle, and a normal line of the reference plane is parallel to any one coronal plane of the brain.

Accordingly, the straight line at which the pathway is located is disposed within a specific reference plane, and forms a specific acute angle (i.e., the second preset angle) with any one transverse plane of the brain. To set the reference plane, a plurality of conditions need to be satisfied as follows: the extremum point must be within the reference plane; the reference plane and any one sagittal plane form a specific acute angle (i.e., the first preset angle); and the normal line of the reference plane is parallel to the coronal plane, that is, a projection of the reference plane on the coronal plane is a straight line. In this way, the straight line where the planned pathway is located may pass through the anterior limb of the internal capsule and the nucleus accumbens along a specific direction and at a specific angle. Therefore, the electrode lead implanted according to such a pathway can pass through the anterior limb of the internal capsule and the nucleus accumbens along a specific direction and at a specific angle, thereby achieving the combined electric stimulation therapy for these two brain tissues.

In some possible embodiments of the present disclosure, the first preset angle is not less than 5 degrees and not greater than 85 degrees, and the second preset angle is not less than 15 degrees and less than 90 degrees.

Accordingly, since the brain structure varies from person to person and each person differs in brain structure, the value of each of the first preset angle and the second preset angle may be within a wide value range, as long as the combined electrical stimulation can be performed on the anterior limb of the internal capsule and the nucleus accumbens in one hemisphere of the brain of the patient.

In some possible embodiments of the present disclosure, the first preset angle is not less than 15 degrees and not greater than 45 degrees, and the second preset angle is not less than 40 degrees and not greater than 85 degrees.

Accordingly, although each person differs in brain structure, most people have a relatively similar brain structure; in terms of probability, a relatively accurate angle range can be preferably used to quickly determine the direction of the implantation pathway, which is sufficient to deal with the normal condition of most people; and for a small subset of people whose brain structures significantly differ from those of ordinary people, a wider range can be used as an alternative for helping a physician to plan a pathway for implanting the electrode lead.

In some possible embodiments of the present disclosure, the processor is further configured to determine the first preset angle and the second preset angle by:
locating a set point of the anterior limb of the internal capsule on the basis of the image data to obtain location data of the set point; and
determining the first preset angle and the second preset angle on the basis of the location data of the set point and the location data of the extremum point.

Accordingly, before the implantation pathway is determined by using the first preset angle, the second preset angle and the extremum point, taking the set point of the anterior limb of the internal capsule and the extremum point of the nucleus accumbens as constraints greatly reduces the value ranges of the first and second preset angles, as well as the range of the implantation pathway of the electrode lead during an implantation process, in particular when the values of the first and second preset angles can be within a wider value range, such that the data volume of all the feasible solutions of the first and second preset angles can be greatly decreased.

In some possible embodiments of the present disclosure, the processor is further configured to locate the extremum point of the ventral contour of the nucleus accumbens by:
locating a reference point on the basis of the image data, and generating a two-dimensional image of the brain corresponding to the reference point, wherein the two-dimensional image of the brain corresponding to the reference point includes one or more of a two-dimensional image of a coronal plane, a two-dimensional image of a sagittal plane, and a two-dimensional image of a transverse plane; and
locating the extremum point of the ventral contour of the nucleus accumbens by using the two-dimensional image of the brain corresponding to the reference point.

Accordingly, the reference point is located by using the image data, wherein the reference point may be, for example, an anterior commissure, a posterior commissure, or a midpoint between the two; after the reference point is positioned, the coronal plane, sagittal plane, and transverse plane of the brain corresponding to the reference point, i.e., the coronal plane (in other words, the reference point is within the coronal plane), sagittal plane, and transverse plane passing through the reference point, can be located, and one or more of two-dimensional images corresponding to the coronal plane, sagittal plane, and transverse plane are generated by using three-dimensional image data; and since the ventral contour of the nucleus accumbens has a parabola-like shape (the opening of the parabola is upward and outward) presented in the above two-dimensional image, the extremum point of the ventral contour of the nucleus accumbens can be located therefrom, and the step of locating the extremum point can be implemented by intelligent identification or manual calibration. For a physician, such a method for locating the extremum point is very visual and can be quickly calibrated by experience. Furthermore, by means of intelligent identification, an edge detection algorithm and/or an image segmentation algorithm may also be used to quickly identify the contour of the nucleus accumbens, such that the extremum point of the ventral contour of the nucleus accumbens is positioned. In the pathway planning apparatus according to the present application, the two-dimensional image is generated by using the reference point, and the extremum point is located by using the two-dimensional image. Such a method of locating the extremum point is simple in computing process, low in computing load, and high in computing speed, and also has fewer computing resources consumed.

In some possible embodiments of the present disclosure, the reference point is a midpoint of a connecting line between an anterior commissure and a posterior commissure of the brain; or
the reference point is the anterior commissure of the brain; or
the reference point is the posterior commissure of the brain.

Accordingly, by taking the anterior commissure, the posterior commissure, or the midpoint of the connecting line between the anterior commissure and the posterior commissure as a reference point, the advantages of simple operation and easy implementation are achieved, regardless of whether the intelligent identification mode or the manual calibration mode is used. For a physician, such a method of positioning the reference point is very visual, and can be quickly calibrated by experience. Furthermore, by means of intelligent identification, the edge detection algorithm may also be used to quickly obtain the contour of the entire brain, the anterior commissure and the posterior commissure can be positioned therefrom, such that the reference point is positioned.

In some possible embodiments of the present disclosure, the processor is further configured to locate the extremum point of the ventral contour of the nucleus accumbens by:
receiving an adjustment operation for each of the two-dimensional images, and in response to the adjustment operation, adjusting one or more of the following parameters of the two-dimensional image: brightness, contrast, saturation, exposure, hue, grayscale, and scaling ratio; and locating the extremum point of the ventral contour of the nucleus accumbens by using the adjusted two-dimensional image.

Accordingly, a physician can manually adjust the parameters of the two-dimensional images, and adjusting the parameters can lead to a change in the display effect of the two-dimensional image, which facilitates the determination of the extremum point therefrom. The parameters adjusted are not limited in the present application, and may be, for example, one or more of a plurality of parameters that affect a display effect. Obviously, the adjustment of one or more of these parameters enables the ventral contour of the nucleus accumbens to be more prominent and clearer (or in other words, with higher contrast), which makes the positioned extremum point more precise and reliable with higher positioning speed and high positioning efficiency, such that the efficiency of pathway planning is improved as a whole.

In some possible embodiments of the present disclosure, the adjustment operation is an operation of adjusting a parameter curve, and is configured to adjust the brightness, contrast, or grayscale of the two-dimensional image; or the adjustment operation is an operation of adjusting a parameter progress bar, and is configured to adjust the brightness, contrast, saturation, exposure, hue, grayscale, and scaling ratio of the two-dimensional image; or the adjustment operation is an operation of adjusting a parameter value, and is configured to adjust the brightness, contrast, saturation, exposure, hue, grayscale, and scaling ratio of the two-dimensional image.

Accordingly, the physician is allowed to adjust the brightness or contrast by adjusting the parameter curve, or to adjust a variety of parameters by adjusting the parameter progress bars, or to adjust a variety of parameters by adjusting the parameter values, such that the physician can choose a parameter adjustment mode on the basis of personal preference in order to quickly adjust the display effect of the two-dimensional image, thereby further improving the efficiency of pathway planning.

In some possible embodiments of the present disclosure, the processor is further configured to locate the extremum point of the ventral contour of the nucleus accumbens by:

generating a three-dimensional model of the brain of the patient on the basis of the image data; and locating the extremum point of the ventral contour of the nucleus accumbens by using the three-dimensional model.

Accordingly, the three-dimensional model of the brain is generated by using the image data, the extremum point is then located by means of the three-dimensional model, and the extremum point can be located in a manner of intelligent identification or manual calibration. When manual calibration is used, the three-dimensional model has visuality stronger than that of the image data and the two-dimensional image, and the physician may calibrate the extremum point more conveniently and quickly. When intelligent identification is used, compared with the image data and the two-dimensional image (the image data and the two-dimensional image needing to be completed by means of an interpolation algorithm so as to obtain the extremum point), the three-dimensional model has a continuous shape (or contour), and can perform computation quickly to obtain the extremum point without completing the data, and it is low in computing load, high in computing speed, and high in computing efficiency, and also has fewer computing resources consumed.

In some possible embodiments of the present disclosure, the processor is further configured to plan the pathway by:

generating a three-dimensional model of the brain of the patient on the basis of the image data;

displaying the three-dimensional model by using a display device, wherein the three-dimensional model includes a three-dimensional structure of the nucleus accumbens and a three-dimensional structure of the anterior limb of the internal capsule; and receiving a pathway planning operation by using an interactive device, and in response to the pathway planning operation, planning the pathway.

Accordingly, the nucleus accumbens and the anterior limb of the internal capsule can be simultaneously displayed in the three-dimensional model, such that the physician designs a surgical pathway according to the displayed three-dimensional structures of two targets (i.e., the nucleus accumbens and the anterior limb of the internal capsule).

Figure 12:
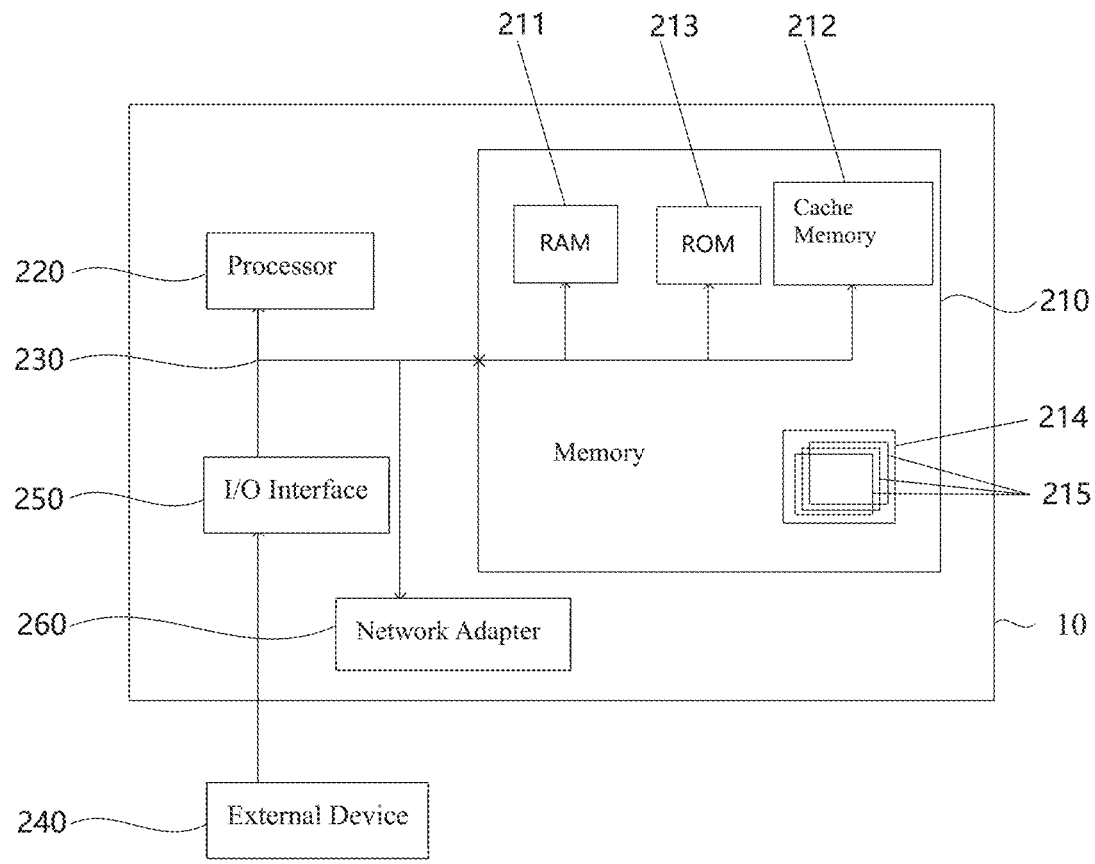
FIG. 12 shows a structural block diagram of a pathway planning apparatus according to an embodiment of the present application.

Referring to FIG. 12, it shows a structural block diagram of a pathway planning apparatus 10 according to an embodiment of the present application. The pathway planning apparatus 10 may include, for example, at least one memory 210, at least one processor 220, and a bus 230 for connecting different platform systems.

The memory 210 may include a readable medium in the form of a volatile memory, for example, a random access memory (RAM) 211 and/or a cache memory 212, and may further include a read-only memory (ROM) 213.

The memory 210 also stores a computer program, which can be executed by the processor 220 to enable the processor 220 to achieve the function of any pathway planning apparatus described above. The specific implementation way of the computer program achieves the same technical effect as that achieved by the implementation way recited in the method embodiments described above, and thus, some of the details are not repeated any more.

The memory 210 may further include a utility tool 214 having at least one program module 215. Such a program module 215 includes, but is not limited to: an operating system, one or more application programs, other program modules and program data. Each or a combination of these examples may include the implementation of a network environment.

Correspondingly, the processor 220 may execute the computer program described above, and may execute the utility tool 214.

The processor 220 may include one or more application specific integrated circuits (ASIC), a DSP, a programmable logic device (PLD), a complex programmable logic device (CPLD), a field-programmable gate array (FPGA), or other electronic components.

The bus 230 may represent one or more of several types of bus structures and includes a memory bus or memory pathway planning apparatus, a peripheral bus, a graphics acceleration port, a processor, or a local area bus using any bus structure of a variety of bus structures.

The pathway planning apparatus 10 may also communicate with one or more external devices 240 (for example, a keyboard, a pointing device, a Bluetooth device, etc.), and may also communicate with one or more devices capable of interacting with the pathway planning apparatus and/or any device (for example, a router, a modem, etc.) enabling the pathway planning apparatus 10 to communicate with one or more other computing devices. Such communications may be carried out via an input/output interface 250. Moreover, the pathway planning apparatus may also communicate with one or more networks (for example, a local area network (LAN), a wide area network (WAN), and/or a public network, such as the Internet) via a network adapter 260. The network adapter 260 may be communicated with other modules of the pathway planning apparatus 10 via the bus 230. It should be understood that, although not shown in the figures, other hardware and/or software modules, including but not limited to a microcode, a device driver, a redundant processor, an external disk drive array, a RAID system, a tape driver, and a data backup storage platform, etc., may be used in combination with the pathway planning apparatus 200.

The present application further provides a computer-readable storage medium storing a computer program. The computer program, when executed by the processor, achieves the function of any pathway planning apparatus described above, or implements the steps of any pathway planning method described above. The specific implementation way of the computer-readable storage medium achieves the same technical effect as that achieved by the implementation way recited in the embodiments of the pathway planning method described above, and thus, some of the details are not repeated any more.

Figure 13:
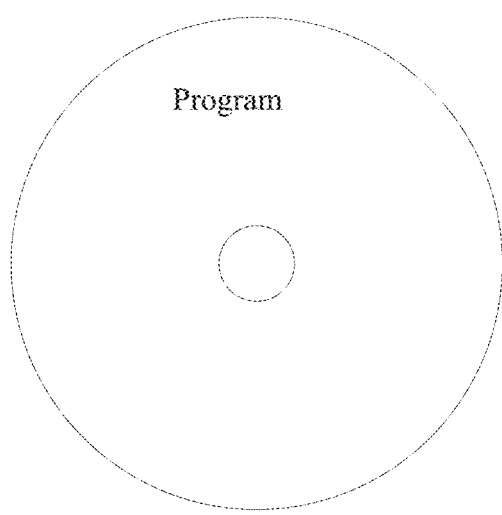
FIG. 13 shows a schematic structural diagram of a program product for implementing a pathway planning method according to an embodiment of the present application.

Referring to FIG. 13, it shows a schematic structural diagram of a program product for implementing a pathway planning method according to the present application. The program product may take the form of a portable compact disc read-only memory (CD-ROM) and include a program code, and may run on a terminal device, for example, a personal computer. However, the program product of the present invention is not limited thereto, and in the present application, the readable storage medium may be any tangible medium containing or storing a program, which can be used by or in combination with an instruction execution system, apparatus, or device. The program product may include one readable medium or any combination of more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of the readable storage medium include: an electrical connection having one or more leads, a portable disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

The computer-readable storage medium may include a data signal propagated in a baseband or as part of a carrier, and a readable program code is carried in the data signal. Such a propagated data signal may take a variety of forms, including but not limited to an electromagnetic signal, an optical signal, or any suitable combination of the above. The readable storage medium may further be any readable medium that may send, propagate, or transmit a program used by or in combination with an instruction execution system, apparatus or device. The program code included in the readable storage medium may be transmitted by using any suitable medium, which includes but is not limited to wireless means, wired means, optical cables, RF, etc., and any suitable combination of the above. The program code for executing the operation of the present invention may be written in any combination of one or more programming languages, which include object-oriented programming languages such as Java and C++, as well as conventional procedural programming languages such as C language or similar programming languages. The program code may be executed entirely on a user computing device, executed partially on a user equipment, executed as a stand-alone software package, executed partially on the user computing device and partially on a remote computing device, or executed entirely on the remote computing device or a server. In a case where the remote computing device is involved, the remote computing device may be connected to the user computing device via any type of network including a local area network (LAN) or a wide area network (WAN), or may be connected to an external computing device (for example, via Internet by means of an Internet service provider).

Referring to FIG. 14, it shows a schematic flow chart of a surgical method according to an embodiment of the present application. The surgical method comprises:

Step S701: planning a pathway for implanting an electrode lead into a brain of a patient, wherein the planned pathway satisfies the following condition: if the electrode lead is implanted into the brain of the patient according to the pathway, the electrode lead is capable of simultaneously making contact with an anterior limb of an internal capsule and a nucleus accumbens in one hemisphere of the brain of the patient; and Step S702: executing a surgical operation of implanting the electrode lead into the brain of the patient according to the pathway, such that the electrode lead makes contact with an anterior limb of an internal capsule and a nucleus accumbens in one hemisphere of the brain of the patient;

wherein the electrode lead is configured to deliver an electrical stimulation to the anterior limb of the internal capsule and the nucleus accumbens.

In some embodiments, executing a surgical operation of implanting the electrode lead into the brain of the patient comprises implanting the electrode lead into the brain of the patient such that the electrode lead passes through the anterior limb of the internal capsule and the nucleus accumbens from superior to inferior, from anterior to posterior and from lateral to medial.

All pathway planning methods described above may be used for the surgical method. The specific implementation way of planning a pathway of the surgical method achieves the same technical effect as that achieved by the implementation way recited in the embodiments of the pathway planning method described above, and thus, some of the details are not repeated any more.

According to the surgical method of the present invention, a specific implantation pathway is planned for the electrode lead, and the electrode lead is implanted into one hemisphere (for example, a left hemisphere or a right hemisphere) of the brain of the patient according to the planned pathway, such that a combined electrical stimulation can be performed on the nucleus accumbens and the anterior limb of the internal capsule in this hemisphere for treating the patient. The surgical method of the present invention enables the electrode lead to simultaneously make contact with the anterior limb of the internal capsule and the nucleus accumbens in one hemisphere. In this way, the electrode lead is capable of simultaneously delivering the electrical stimulation to the anterior limb of the internal capsule and the nucleus accumbens, such that a combined electrical stimulation therapy is achieved.

The present application is described from the perspectives of intended use, efficacy, progress, novelty, etc., and complies with the patent lay in the sense of functional enhancement and use requirements. The above description and accompanying drawings of the present application merely provide preferred embodiments of the present application, and are not intended to limit the present application. Therefore, any equivalent substitutions or modifications and the like, which are similar to the constructions, apparatuses, features, etc. of the present invention and are made depending on the scope of patent application of the present application, shall fall within the protection scope of patent application of the present application.

What is claimed is:

1. A surgical system, comprising:
a pathway planning apparatus comprising a processor configured to plan a pathway to obtain a planned pathway for implanting an electrode lead into a brain of a patient such that after the electrode lead has been implanted into the brain of the patient according to the planned pathway, the electrode lead is capable of making contact with both an anterior limb of an internal capsule and a nucleus accumbens in one hemisphere of the brain of the patient;
wherein planning the pathway to obtain the planned pathway for implanting the electrode lead into the brain of the patient comprises:
acquiring image data of the brain of the patient, the image data comprising magnetic resonance image data and/or CT image data;
locating an extremum point of a ventral contour of the nucleus accumbens on the basis of the image data to obtain location data of the extremum point, and locating a set point of the anterior limb of the internal capsule on the basis of the image data to obtain location data of the set point;
planning, on the basis of the location data of the extremum point and the location data of the set point, the pathway for implanting the electrode lead into the brain of the patient, such that a straight line where the pathway is located passes the set point and the extremum point from superior to inferior, from anterior to posterior and from lateral to medial; and
a surgical apparatus for executing a surgical operation of implanting the electrode lead into the brain of the patient according to the planned pathway, such that the electrode lead makes contact with both the anterior limb of the internal capsule and the nucleus accumbens in one hemisphere of the brain of the patient,
wherein the electrode lead is configured to deliver an electrical stimulation to the anterior limb of the internal capsule and the nucleus accumbens.

2. The surgical system according to claim 1, wherein the patient suffers from a disease comprising one or more of the following mental disorders: depressive disorder, manic-depressive psychosis, anxiety disorder, post-traumatic stress psychological disorder, obsessive-compulsive disorder, behavior disorder, emotional disorder, memory disorder, psychological state disorder, drug addiction, and autism.

3. The surgical system according to claim 2, wherein the processor is further configured to plan the pathway by:
acquiring image data of the brain of the patient, the image data comprising magnetic resonance image data and/or CT image data;
locating an extremum point of a ventral contour of the nucleus accumbens on the basis of the image data to obtain location data of the extremum point; and
planning, on the basis of the location data of the extremum point, the pathway for implanting the electrode lead into the brain of the patient, such that a straight line where the pathway is located passes the extremum point from superior to inferior, from anterior to posterior and from lateral to medial.

4. The surgical system according to claim 3, wherein the processor is further configured to determine the straight line by:
locating a set point of the anterior limb of the internal capsule on the basis of the image data to obtain location data of the set point; and
determining the straight line on the basis of the location data of the set point and the location data of the extremum point, such that the straight line passes the set point and the extremum point.

5. The surgical system according to claim 4, wherein the processor is further configured to locate the set point of the anterior limb of the internal capsule by
acquiring a segmentation result of the anterior limb of the internal capsule on the basis of the image data, wherein the segmentation result of the anterior limb of the internal capsule is used to indicate a plurality of regions of the anterior limb of the internal capsule;
determining one of the regions as a region of interest on the basis of a mapping relation between each region and a prefrontal lobe, such that a white matter fiber tract running over the region of interest can be mapped to a prefrontal cortex of interest, wherein the prefrontal cortex of interest refers to a prefrontal cortex associated with the disease of the patient; and
locating, from the region of interest, the set point of the anterior limb of the internal capsule.

6. The surgical system according to claim 3, wherein the processor is further configured to determine the straight line by:
making the straight line be within a reference plane with an acute angle formed between the straight line and any one transverse plane of the brain being equal to a second preset angle,
wherein the reference plane satisfies the following condition: the extremum point is within the reference plane, and an acute angle formed by the reference plane and any one sagittal plane of the brain is equal to a first preset angle, and a normal line of the reference plane is parallel to any one coronal plane of the brain.

7. The surgical system according to claim 6, wherein the first preset angle is not less than 5 degrees and not greater than 85 degrees, and the second preset angle is not less than degrees and less than 90 degrees.

8. The surgical system according to claim 7, wherein the first preset angle is not less than 15 degrees and not greater than 45 degrees, and the second preset angle is not less than 40 degrees and not greater than 85 degrees.

9. The surgical system according to claim 8, wherein the processor is further configured to determine the first preset angle and the second preset angle by:
locating the set point of the anterior limb of the internal capsule on the basis of the image data to obtain the location data of the set point; and
determining the first preset angle and the second preset angle on the basis of the location data of the set point and the location data of the extremum point.

10. The surgical system according to claim 3, wherein the processor is further configured to locate the extremum point of the ventral contour of the nucleus accumbens by:
locating a reference point on the basis of the image data, and generating a two-dimensional image of the brain corresponding to the reference point, wherein the two-dimensional image of the brain corresponding to the reference point comprises one or more of a two-dimensional image of a coronal plane, a two-dimensional image of a sagittal plane, and a two-dimensional image of a transverse plane; and locating the extremum point of the ventral contour of the nucleus accumbens by using the two-dimensional image of the brain corresponding to the reference point.

11. The surgical system according to claim 10, wherein the reference point is a midpoint of a connecting line between an anterior commissure and a posterior commissure of the brain; or the reference point is the anterior commissure of the brain; or the reference point is the posterior commissure of the brain.

12. The surgical system according to claim 10, wherein the processor is further configured to locate the extremum point of the ventral contour of the nucleus accumbens by:

receiving an adjustment operation for each of the two-dimensional images, and in responsive to the adjustment operation, adjusting one or more of the following parameters of the two-dimensional image: brightness, contrast, saturation, exposure, hue, grayscale, and scaling ratio; and locating the extremum point of the ventral contour of the nucleus accumbens by using the adjusted two-dimensional image.

13. The surgical system according to claim 12, wherein the adjustment operation is an operation of adjusting a parameter curve, and is configured to adjust the brightness, contrast, or grayscale of the two-dimensional image; or the adjustment operation is an operation of adjusting a parameter progress bar, and is configured to adjust the brightness, contrast, saturation, exposure, hue, grayscale, and scaling ratio of the two-dimensional image; or the adjustment operation is an operation of adjusting a parameter value, and is configured to adjust the brightness, contrast, saturation, exposure, hue, grayscale, and scaling ratio of the two-dimensional image.

14. The surgical system according to claim 3, wherein the processor is further configured to locate the extremum point of the ventral contour of the nucleus accumbens by:

generating a three-dimensional model of the brain of the patient on the basis of the image data; and locating the extremum point of the ventral contour of the nucleus accumbens by using the three-dimensional model.

15. The surgical system according to claim 2, wherein the processor is further configured to plan the pathway by:

generating a three-dimensional model of the brain of the patient on the basis of the image data;

displaying the three-dimensional model, wherein the three-dimensional model comprises a three-dimensional structure of the nucleus accumbens and a three-dimensional structure of the anterior limb of the internal capsule; and receiving a pathway planning operation, and planning the pathway in responsive to the pathway planning operation.

16. A surgical method, comprising:

planning a pathway to obtain a planned pathway for implanting an electrode lead into a a brain of a patient, wherein the planned pathway satisfies the following condition: after the electrode lead has been implanted into the brain of the patient according to the planned pathway, the electrode lead is capable of making contact with both an anterior limb of an internal capsule and a nucleus accumbens in one hemisphere of the brain of the patient; and executing a surgical operation of implanting the electrode lead into the brain of the patient according to the planned pathway, such that the electrode lead makes contact with both the anterior limb of the internal capsule and the nucleus accumbens in one hemisphere of the brain of the patient, wherein planning a pathway to obtain the planned pathway for implanting the electrode lead into the brain of a patient comprises:

acquiring image data of the brain of the patient, the image data comprising magnetic resonance image data and/or CT image data;

locating an extremum point of a ventral contour of the nucleus accumbens on the basis of the image data to obtain location data of the extremum point, and locating a set point of the anterior limb of the internal capsule on the basis of the image data to obtain location data of the set point;

planning, on the basis of the location data of the extremum point and the location data of the set point, the pathway for implanting the electrode lead into the brain of the patient, such that a straight line where the pathway is located passes the set point and the extremum point from superior to inferior, from anterior to posterior and from lateral to medial;

wherein the electrode lead is configured to deliver an electrical stimulation to the anterior limb of the internal capsule and the nucleus accumbens.

17. The surgical method according to claim 16, wherein locating a set point of the anterior limb of the internal capsule comprises:

acquiring a segmentation result of the anterior limb of the internal capsule on the basis of the image data, wherein the segmentation result of the anterior limb of the internal capsule is used to indicate a plurality of regions of the anterior limb of the internal capsule;

determining one of the regions as a region of interest on the basis of a mapping relation between each region and a prefrontal lobe, such that a white matter fiber tract running over the region of interest can be mapped to a prefrontal cortex of interest, wherein the prefrontal cortex of interest refers to a prefrontal cortex associated with the disease of the patient; and locating, from the region of interest, the set point of the anterior limb of the internal capsule.

18. The surgical method according to claim 16, wherein the straight line is determined by:

making the straight line be within a reference plane with an acute angle formed between the straight line and any one transverse plane of the brain being equal to a second preset angle, wherein the reference plane satisfies the following condition: the extremum point is within the reference plane, and an acute angle formed by the reference plane and any one sagittal plane of the brain is equal to a first preset angle, and a normal line of the reference plane is parallel to any one coronal plane of the brain.

19. The surgical method according to claim 18, wherein the first preset angle is not less than 5 degrees and not greater than 85 degrees, and the second preset angle is not less than 15 degrees and less than 90 degrees.

20. The surgical method according to claim 19, wherein the first preset angle is not less than 15 degrees and not greater than 45 degrees, and the second preset angle is not less than 40 degrees and not greater than 85 degrees.

21. The surgical method according to claim 18, wherein the surgical method further comprises determining the first preset angle and the second preset angle by:
   locating the set point of the anterior limb of the internal capsule on the basis of the image data to obtain the location data of the set point; and
   determining the first preset angle and the second preset angle on the basis of the location data of the set point and the location data of the extremum point.

22. The surgical method according to claim 16, wherein locating the extremum point of the ventral contour of the nucleus accumbens comprises:
   locating a reference point on the basis of the image data, and generating a two-dimensional image of the brain corresponding to the reference point, wherein the two-dimensional image of the brain corresponding to the reference point comprises one or more of a two-dimensional image of a coronal plane, a two-dimensional image of a sagittal plane, and a two-dimensional image of a transverse plane; and
   locating the extremum point of the ventral contour of the nucleus accumbens by using the two-dimensional image of the brain corresponding to the reference point.

23. The surgical method according to claim 22, wherein the reference point is a midpoint of a connecting line between an anterior commissure and a posterior commissure of the brain; or
   the reference point is the anterior commissure of the brain; or
   the reference point is the posterior commissure of the brain.

24. The surgical method according to claim 22, wherein locating the extremum point of the ventral contour of the nucleus accumbens further comprises:
   receiving an adjustment operation for each of the two-dimensional images, and in responsive to the adjustment operation, adjusting one or more of the following parameters of the two-dimensional image: brightness, contrast, saturation, exposure, hue, grayscale, and scaling ratio; and
   locating the extremum point of the ventral contour of the nucleus accumbens by using the adjusted two-dimensional image.

25. The surgical method according to claim 24, wherein
   the adjustment operation is an operation of adjusting a parameter curve, and is configured to adjust the brightness, contrast, or grayscale of the two-dimensional image; or
   the adjustment operation is an operation of adjusting a parameter progress bar, and is configured to adjust the brightness, contrast, saturation, exposure, hue, grayscale, and scaling ratio of the two-dimensional image; or
   the adjustment operation is an operation of adjusting a parameter value, and is configured to adjust the brightness, contrast, saturation, exposure, hue, grayscale, and scaling ratio of the two-dimensional image.

26. The surgical method according to claim 16, wherein locating the extremum point of the ventral contour of the nucleus accumbens comprises:
   generating a three-dimensional model of the brain of the patient on the basis of the image data; and
   locating the extremum point of the ventral contour of the nucleus accumbens by using the three-dimensional model.

27. The surgical method according to claim 16, wherein planning a pathway for implanting an electrode lead into a brain of a patient comprises:
   generating a three-dimensional model of the brain of the patient on the basis of the image data;
   displaying the three-dimensional model, wherein the three-dimensional model comprises a three-dimensional structure of the nucleus accumbens and a three-dimensional structure of the anterior limb of the internal capsule; and
   receiving a pathway planning operation and planning the pathway in responsive to the pathway planning operation.

* * * * *